(12) United States Patent
Nomura et al.

(10) Patent No.: US 7,526,189 B2
(45) Date of Patent: *Apr. 28, 2009

(54) OPTICAL IMAGE STABILIZER

(75) Inventors: Hiroshi Nomura, Saitama (JP); Shinya Suzuka, Saitama (JP); Ken Endo, Saitama (JP)

(73) Assignee: Hoya Corporation, Tokyo (JP)

( * ) Notice: Subject to any disclaimer, the term of this patent is extended or adjusted under 35 U.S.C. 154(b) by 379 days.

This patent is subject to a terminal disclaimer.

(21) Appl. No.: 11/477,417

(22) Filed: Jun. 30, 2006

(65) Prior Publication Data

US 2007/0003263 A1    Jan. 4, 2007

(30) Foreign Application Priority Data

Jun. 30, 2005    (JP)    ............................. 2005-192554

(51) Int. Cl.
*G03B 17/00*    (2006.01)
*G03B 27/64*    (2006.01)
*G03B 7/02*    (2006.01)

(52) U.S. Cl. ........................... 396/55; 396/75; 359/557; 359/811

(58) Field of Classification Search ................... 396/52, 396/55, 75, 542; 348/340, 208.7, 375; 359/811, 359/813, 557; 250/201.2
See application file for complete search history.

(56) References Cited

U.S. PATENT DOCUMENTS

| | | | | |
|---|---|---|---|---|
| 4,711,548 A | | 12/1987 | Arakawa et al. | ............ 396/542 |
| 5,172,276 A | * | 12/1992 | Ueyama et al. | ............. 359/813 |
| 5,416,558 A | | 5/1995 | Katayama et al. | ............. 396/52 |
| 5,614,974 A | | 3/1997 | Soshi et al. | .................... 396/55 |
| 5,680,251 A | * | 10/1997 | Kato et al. | .................. 359/557 |
| 5,734,931 A | * | 3/1998 | Inoue et al. | .................... 396/52 |
| 5,745,800 A | * | 4/1998 | Kanbara et al. | ............... 396/55 |
| 5,845,157 A | | 12/1998 | Imura et al. | ................... 396/55 |

(Continued)

FOREIGN PATENT DOCUMENTS

GB    2404810    2/2005

(Continued)

OTHER PUBLICATIONS

U.S. Appl. No. 11/477,475 to Nomura et al., which was filed on Jun. 30, 2006.

(Continued)

*Primary Examiner*—Melissa J Koval
(74) *Attorney, Agent, or Firm*—Greenblum & Bernstein, P.L.C.

(57) ABSTRACT

An image stabilizer includes a guide device which guides an image-stabilizing optical element in a guide direction orthogonal to an optical axis and an image shake counteracting driving device which moves the image-stabilizing optical element so as to counteract image shake, including a first moving element moved by a drive source; a second moving element movable relative to the first moving element, and applies a moving force to a holder holding the image-stabilizing optical element when the second moving element is moved by the first moving element; and a moving-element control mechanism which resiliently connects the first and second moving elements to each other to allow the first and second moving elements to selectively move integrally and relative to each other in accordance with a magnitude of a resistance to a movement between the drive source and the holder.

18 Claims, 27 Drawing Sheets

U.S. PATENT DOCUMENTS

| | | | |
|---|---|---|---|
| 6,031,998 | A | 2/2000 | Shono .................. 396/75 |
| 6,225,613 | B1 | 5/2001 | Tsukamoto et al. ...... 250/201.2 |
| 6,366,323 | B1 | 4/2002 | Shono .................. 348/340 |
| 6,978,089 | B2 | 12/2005 | Nomura et al. ............ 396/75 |
| 2001/0030814 | A1 | 10/2001 | Koyama et al. ............ 359/811 |
| 2003/0067544 | A1 | 4/2003 | Wada ................... 348/208.7 |
| 2005/0052570 | A1 | 3/2005 | Enomoto ................. 348/375 |

FOREIGN PATENT DOCUMENTS

| | | |
|---|---|---|
| GB | 2420927 | 6/2006 |
| JP | 6-046314 | 2/1994 |
| JP | 7-028114 | 1/1995 |
| JP | 9-022039 | 1/1997 |
| JP | 10-339897 | 12/1998 |
| JP | 2001-285696 | 10/2001 |
| JP | 2003-110928 | 4/2003 |
| JP | 2003-111449 | 4/2003 |
| JP | 2004-048266 | 2/2004 |
| JP | 2005-250284 | 9/2005 |

OTHER PUBLICATIONS

U.S. Appl. No. 11/477,456 to Nomura et al., which was filed on Jun. 30, 2006.
U.S. Appl. No. 11/477,499 to Nomura et al., which was filed on Jun. 30, 2006.
U.S. Appl. No. 11/477,380 to Nomura et al., which was filed on Jun. 30, 2006.
U.S. Appl. No. 11/477,697 to Nomura et al., which was filed on Jun. 30, 2006.
English language Abstract of JP 7-028114, Jan. 31, 1995.
English language Abstract of JP 9-022039, Jan. 21, 1997.
English language Abstract of JP 10-339897, Dec. 22, 1998.
English language Abstract of JP 2003-110928, Apr. 11, 2003.
English language Abstract of JP 2003-111449, Apr. 11, 2003.
English language Abstract of JP 2004-048266, Feb. 12, 2004.
English language Abstract of JP 2005-250284, Sep. 15, 2005.
English Language Abstract of JP 2001-285696, Oct. 12, 2001.

* cited by examiner

OPTICAL IMAGE STABILIZER

BACKGROUND OF THE INVENTION

1. Field of the Invention

The present invention relates to an optical image stabilizer, incorporated in optical equipment such as a camera or binoculars, for counteracting image shake due to vibrations such as hand shake.

2. Description of the Related Art

Image stabilizers (optical image stabilizers) for optical equipment prevent image shake from occurring on a focal plane by driving a part (image-stabilizing optical element) of an optical system relative to an optical axis thereof in accordance with the direction and the magnitude of vibration, such as hand shake, applied to the optical equipment. However, since the image-stabilizing optical element needs to be driven at high velocity in a fast responsive manner, such movement tends to be a burden on the driving mechanism therefor. Namely, the image-stabilizing optical element easily reaches a mechanical limit of movement thereof in the case where the magnitude of vibration is great, and the movement of the image-stabilizing optical element is easily restricted by some other reason. In such a movement limited state of the image-stabilizing optical element, further application of a driving force to the image-stabilizing optical element causes a driving force transfer mechanism for the image-stabilizing optical element to be subjected to mechanical stress and thus may cause damage to a low-strength portion of the driving force transfer mechanism. Additionally, in the case where the image-stabilizing optical element is supported by a support mechanism at all times to be freely movable, there is a possibility of the image-stabilizing optical element being moved forcibly if a strong external force is applied to the optical equipment in an accident, e.g., when the optical apparatus is accidentally dropped to the ground, which also causes the driving force transfer mechanism for the image-stabilizing optical element to be subjected to mechanical stress.

In the case of using a motor with a feed screw as a driving source for the image-stabilizing optical element, the less the lead angle (pitch) of the feed screw is, the more the accuracy of moving the image-stabilizing optical element (the mechanical resolution thereof) can be enhanced. However, a reduction of the lead angle of the feed screw is disadvantageous to the strength of the feed screw mechanism. Due to this fact, when a high-precision feed screw is adopted, the lead angle thereof being small, there is a possibility of the feed screw being damaged (e.g., the thread jamming). To prevent this problem from occurring, the range of movement of the image-stabilizing optical element can be increased so that the image-stabilizing optical element does not reach a mechanical limit of movement thereof easily, and the image-stabilizing optical element can be mechanically locked when not in operation. However, if the range of movement of the image-stabilizing optical element is increased, the image stabilizer may increase in size. If the image-stabilizing optical element is mechanically locked when not in operation, providing the image-stabilizing optical element with an independent locking mechanism for the image-stabilizing optical element may complicate the structure of the image stabilizer.

SUMMARY OF THE INVENTION

The present invention provides an optical image stabilizer having a simple and small structure that prevents a driving mechanism for an image-stabilizing optical element from being accidentally damaged.

According to an aspect of the present invention, an image stabilizer is provided, including at least one guide device which guides an image-stabilizing optical element in at least one guide direction orthogonal to an optical axis and at least one image shake counteracting driving device which moves the image-stabilizing optical element in the guide direction so as to counteract image shake, the image shake counteracting driving device including at least one first moving element moved in the guide direction by at least one drive source; at least one second moving element which is guided in the guide direction to be movable relative to the first moving element, wherein the second moving element applies a moving force to a holder which holds the image-stabilizing optical element when the second moving element is moved in the guide direction by a movement of the first moving element; and a moving-element control mechanism which resiliently connects the first moving element and the second moving element to each other to allow the first moving element and the second moving element to selectively move integrally and relative to each other in accordance with a magnitude of a resistance to a movement occurring between the drive source and the holder.

It is desirable for the moving-element control mechanism to include a movement limit portion provided between the first moving element and the second moving element in order to limit the range of relative movement between the first moving element and the second moving element to a predetermined range of movement when the movement limit portion is brought into an engaged state; at least one first biasing device which biases the first moving element and the second moving element in directions to bring the movement limit portion into the engaged state; and at least one second biasing device which biases the second moving element in a direction opposite to the biasing direction of the first biasing device.

It is desirable for the first biasing device to be greater in biasing force than the second biasing device.

It is desirable for each of the first biasing device and the second biasing device to be an extension spring.

It is desirable for a pair of the movement limit portions to be provided between the first moving element and the second moving element.

The image stabilizer can include a stationary frame which supports the second moving element in a manner to allow the second moving element to move linearly in the guide direction relative to the stationary frame.

It is desirable for the first biasing device to be installed between the first moving element and the second moving element, and for the second biasing device to be installed between the holder and the stationary frame.

It is desirable for the image stabilizer to include an orthogonal moving frame which supports the holder and is movable in a direction orthogonal to the guide direction of the guide device, for the first biasing device to be installed between the first moving element and the second moving element, and for the second biasing device to be installed between the holder and the orthogonal moving frame.

It is desirable for the drive source to include a motor mounted to the stationary frame.

It is desirable for the drive source to include a motor having a feed screw with which a driven nut member is screw-engaged to be movable on the feed screw in an axial direction thereof. A movement of the driven nut member which moves on the feed screw in the axial direction thereof by a rotation of the feed screw is transferred to the first moving element with the driven nut member in contact with the first moving element.

It is desirable for the image stabilizer to include a biasing device which biases the driven nut member in a direction so as to come in contact with the first moving element.

It is desirable for the biasing device to be a compression coil spring positioned around the feed screw between the drive source and the driven nut member.

It is desirable for the moving-element control mechanism to allow the first moving element and the second moving element to move integrally when the driven nut member and the holder are both movable in the guide direction, and to allow the first moving element and the second moving element to move relative to each other when one and the other of the driven nut member and the holder are movable and immovable in the guide direction.

It is desirable for the guide device to include two guide devices which guide the image-stabilizing optical element linearly in two different guide directions in a plane orthogonal to the optical axis. The image shake counteracting driving device includes two image shake counteracting driving devices which move the image-stabilizing optical element in the two different guide directions, respectively, so as to counteract image shake. Each of the two image shake counteracting driving devices includes the first moving element, the second moving element and the moving-element control mechanism.

It is desirable for the two different guide directions to be orthogonal to each other.

It is desirable for the image stabilizer to be incorporated in an imaging device, the image-stabilizing optical element including an image pickup device.

It is desirable for the image stabilizer to be incorporated in a digital camera having a zoom lens.

In an embodiment, an image stabilizer is provided, including an image-stabilizing optical element guided in at least one guide direction in a plane orthogonal to an optical axis and at least one image shake counteracting driving device which moves the image-stabilizing optical element in the guide direction so as to counteract image shake, the image shake counteracting driving device including a first moving element which is guided in the guide direction, and moved in the guide direction by a drive source of the image shake counteracting driving device; a second moving element which is guided in the guide direction to be movable in the guide direction relative to the first moving element, wherein the second moving element transfers a motion of the first moving element to a holder of the image-stabilizing optical element; and a control mechanism which resiliently connects the first moving element and the second moving element to each other to allow the first moving element and the second moving element to selectively move integrally and relative to each other in accordance with a magnitude of a resistance to a movement of one of the first moving element and the second moving element relative to each other.

According to the present invention, a simple and small structure of the image stabilizer can prevent the driving mechanism for the image-stabilizing optical element from being accidentally damaged without the need to either increase the range of movement of the image-stabilizing optical element or provide the image-stabilizing optical element with any locking mechanism for mechanically locking the image-stabilizing optical element.

The present disclosure relates to subject matter contained in Japanese Patent Application No. 2005-192554 (filed on Jun. 30, 2005), which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
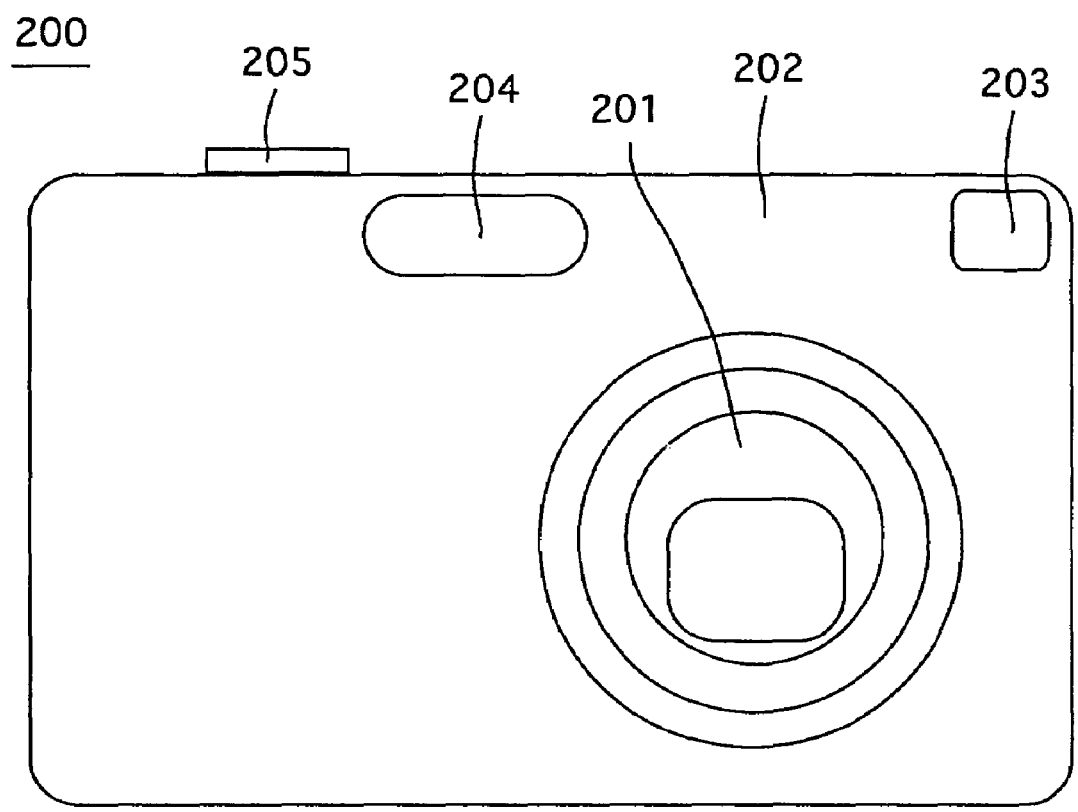
FIG. 1 is a front elevational view of an embodiment of a digital camera incorporating an image stabilizer according to the present invention.

FIG. 1 shows an outward appearance of a digital camera 200 which incorporates an image stabilizer according to the present invention. The digital camera 200 is provided on the front of a camera body 202 thereof with a zoom lens (zoom lens barrel) 201, an optical viewfinder 203 and a flash 204, and is provided on the top of the camera body 202 with a shutter button 205.

Figure 2:
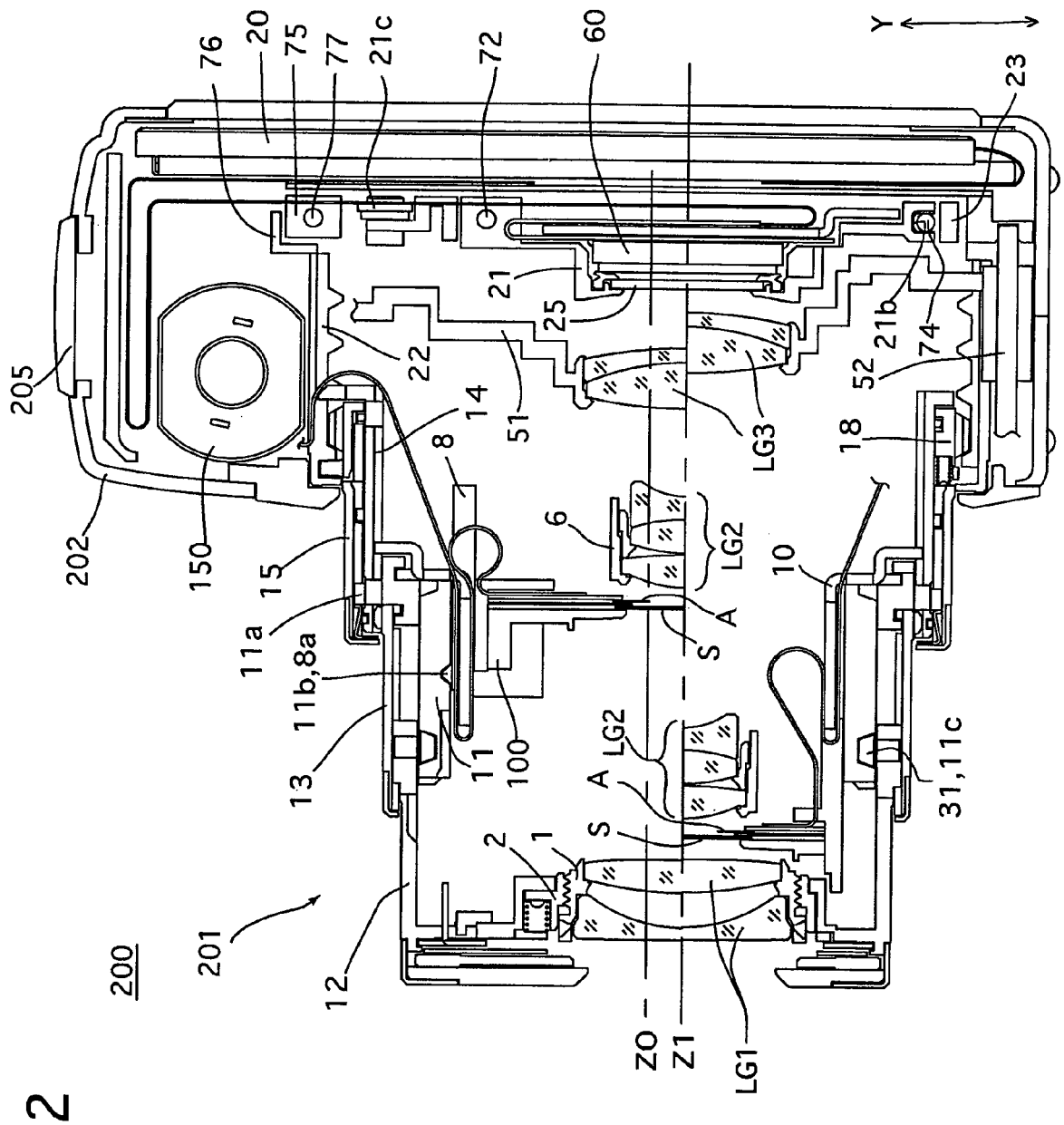
FIG. 2 is a longitudinal sectional view of the digital camera shown in FIG. 1 in a ready-to-photograph state of the zoom lens thereof.
Figure 3:
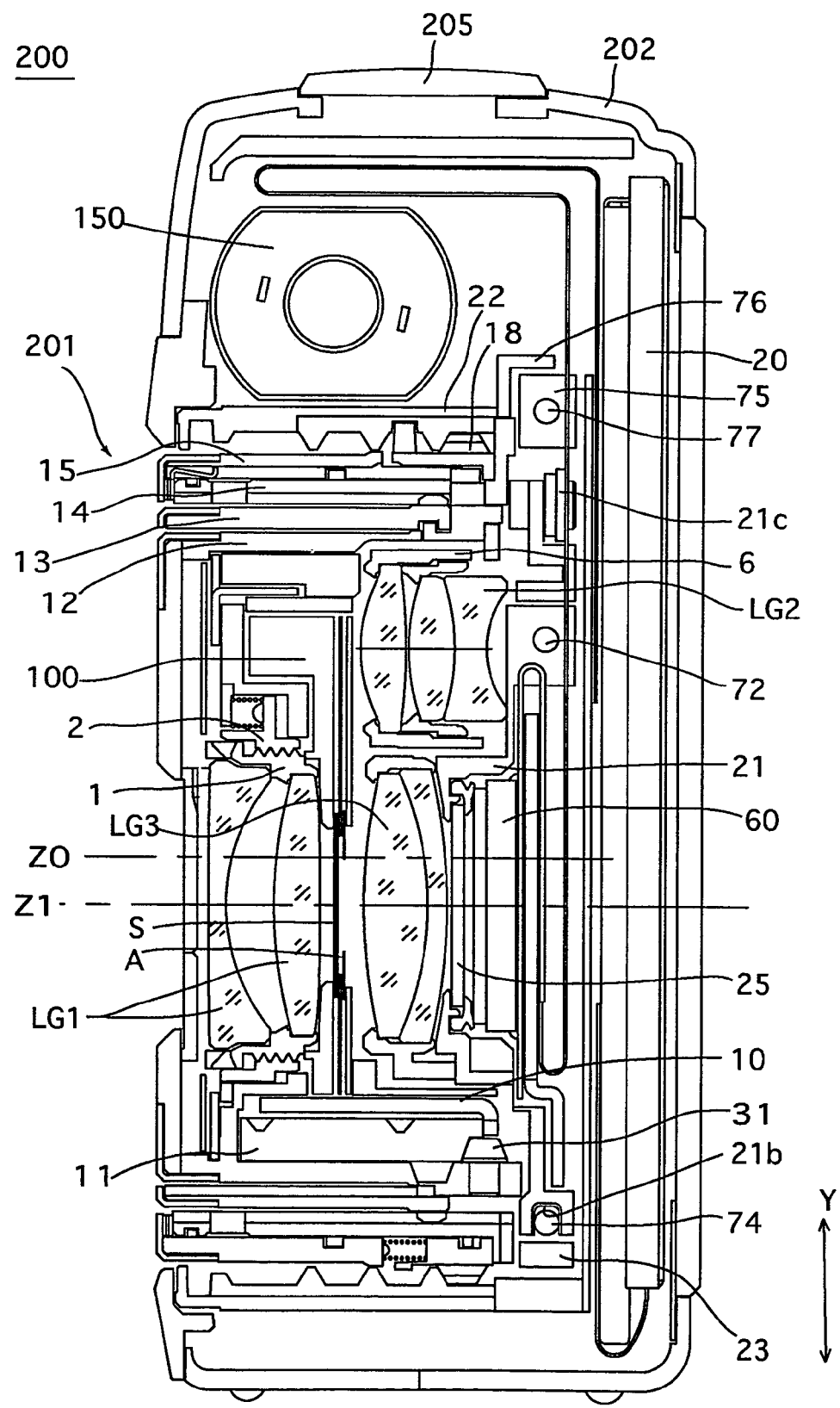
FIG. 3 is a longitudinal sectional view of the digital camera shown in FIG. 1 in the fully-retracted state of the zoom lens.
Figure 5:
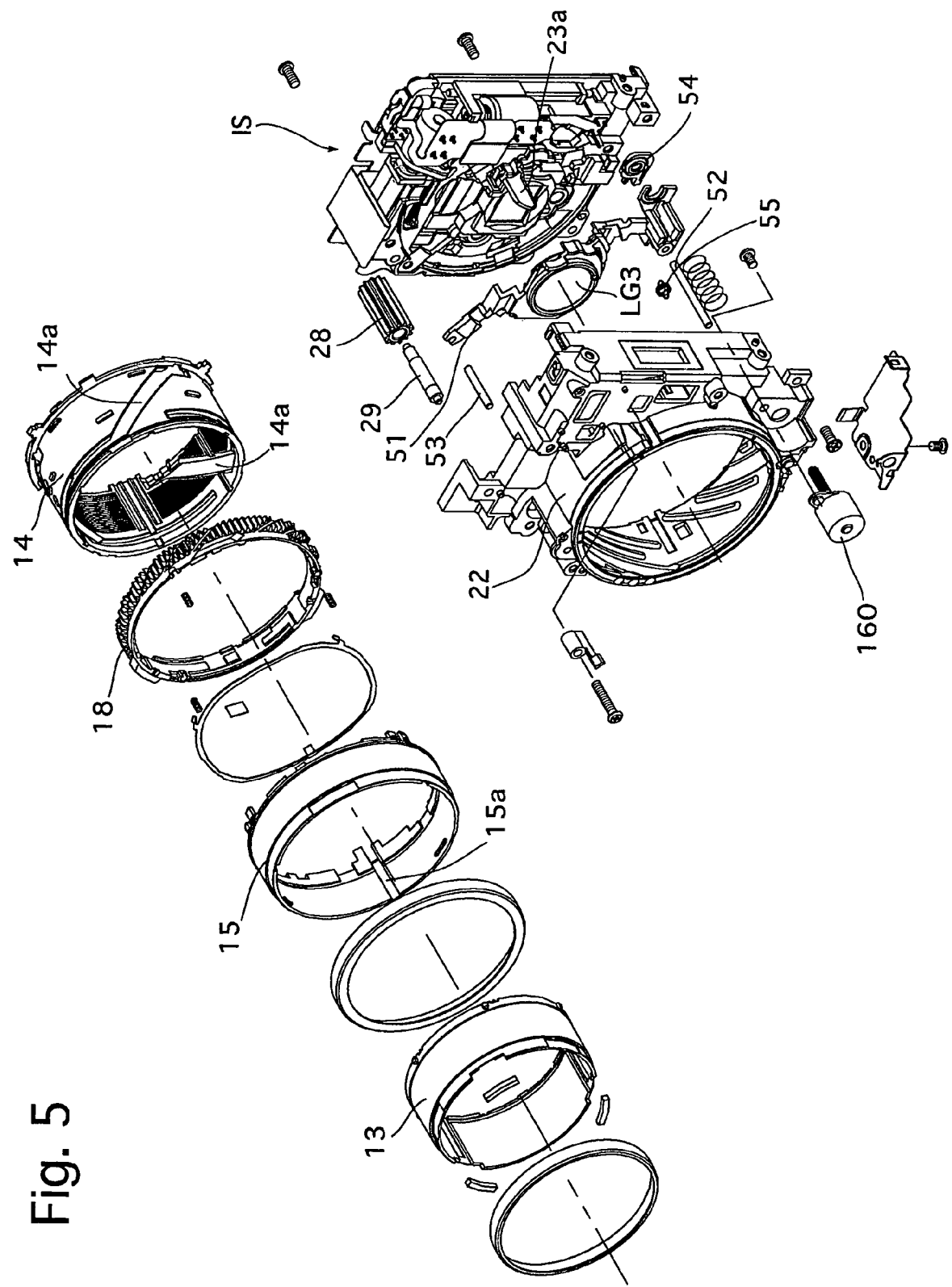
FIG. 5 is an exploded perspective view of a portion of the zoom lens shown in FIG. 4.
Figure 6:
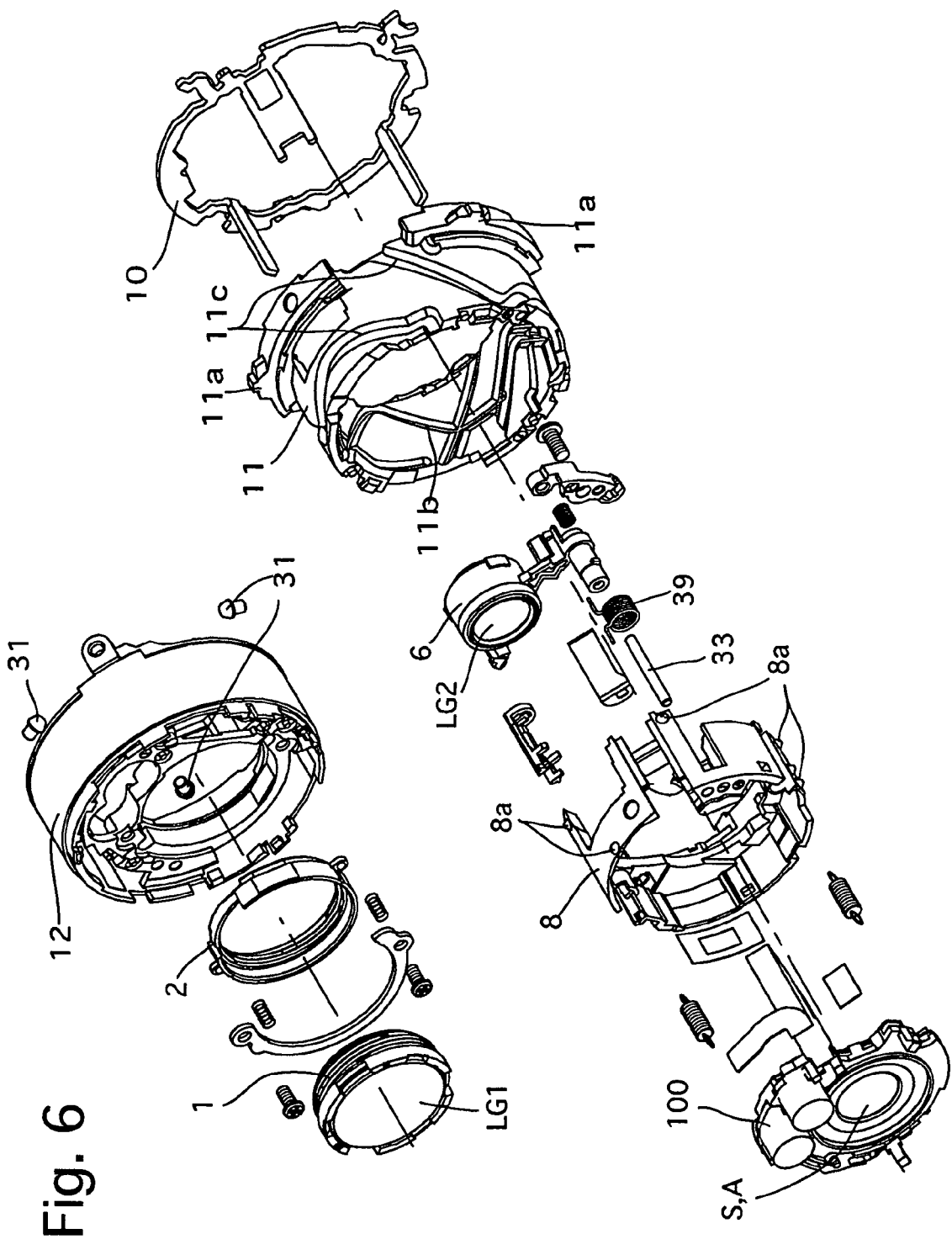
FIG. 6 is an exploded perspective view of another portion of the zoom lens shown in FIG. 4.

The zoom lens 201 of the digital camera 200, longitudinal sectional views of which are shown in FIGS. 2 and 3, is driven to advance toward the object side (leftward viewed in FIGS. 2 and 3) from the camera body 202 as shown in FIG. 2 during a photographing operation. When photography is no being carried out, the digital camera 200 moves from a ready-to-photograph state shown in FIG. 2 to a fully-retracted state shown in FIG. 3 in which the zoom lens 201 is accommodated (fully retracted) in the camera body 202 as shown in FIG. 3. In FIG. 2, the upper half and the lower half of the zoom lens 201 from a photographing optical axis Z1 show a ready-to-photograph state of the zoom lens 201 at the wide-angle extremity and the telephoto extremity, respectively. As shown in FIGS. 5 and 6, the zoom lens 201 is provided with a plurality of ring members (hollow-cylindrical members): a second linear guide ring 10, a cam ring 11, a third movable barrel 12, a second movable barrel 13, a first linear guide ring 14, a first movable barrel 15, a helicoid ring 18 and a stationary barrel 22 which are substantially concentrically arranged about a common axis that is shown as a lens barrel axis Z0 in FIGS. 2 and 3.

The zoom lens 201 is provided with a photographing optical system including a first lens group LG1, a shutter S, an adjustable diaphragm A, a second lens group LG2, a third lens group LG3, a low-pass filter 25 and a CCD image sensor (image-stabilizing optical element) 60 that serves an image pickup device. Optical elements from the first lens group LG1 to the CCD image sensor 60 are positioned on the photographing optical axis (common optical axis) Z1 when the zoom lens 201 is in a ready-to-photograph state. The photographing optical axis Z1 is parallel to the lens barrel axis Z0 and positioned below the lens barrel axis Z0. The first lens group LG1 and the second lens group LG2 are moved along the photographing optical axis Z1 in a predetermined moving manner to perform a zooming operation, and the third lens group LG3 is moved along the photographing optical axis Z1 to perform a focusing operation. In the following description, the term "optical axis direction" refers to a direction parallel to the photographing optical axis Z1 and the terms "object side" and "image side" refer to forward and rearward of the digital camera 200, respectively. Additionally, in the following description, the vertical direction and the horizontal direction of the digital camera 200 in a plane orthogonal to the photographing optical axis Z1 refer are defined as a Y-axis direction and an X-axis direction, respectively.

The stationary barrel 22 is positioned in the camera body 202 and fixed thereto, while a stationary holder (stationary frame) 23 is fixed to a rear portion of the stationary barrel 22. The CCD image sensor 60 and the low-pass filter 25 are supported by the stationary holder 23 via a Y-axis direction moving stage (second moving element) 71 and an X-axis direction moving stage (holder for the image-stabilizing optical element) 21 to be movable in the X-axis direction and the Y-axis direction. The digital camera 200 is provided behind the stationary holder 23 with an LCD panel 20 which indicates visual images and various photographic information.

The zoom lens 201 is provided in the stationary barrel 22 with a third lens frame 51 which supports and holds the third lens group LG3. The zoom lens 201 is provided between the stationary holder 23 and the stationary barrel 22 with a pair of guide shafts 52 and 53 which extend parallel to the photographing optical axis Z1 to guide the third lens frame 51 in the optical axis direction without rotating the third lens frame 51 about the lens barrel axis Z0. The third lens frame 51 is biased forward by a third lens frame biasing spring (extension coil spring) 55. The digital camera 200 is provided with a focusing motor 160 having a rotary drive shaft which is threaded to serve as a feed screw, and the rotary drive shaft is screwed through a screw hole formed on an AF nut 54. If the AF nut 54 is moved rearward by a rotation of the rotary drive shaft of the focusing motor 160, the third lens frame 51 is pressed by the AF nut 54 to move rearward. Conversely, if the AF nut 54 is moved forward, the third lens frame 51 follows the AF nut 54 to move forward by the biasing force of the third lens frame biasing spring 55. Due to this structure, the third lens frame 51 can be moved forward and rearward in the optical axis direction.

Figure 4:
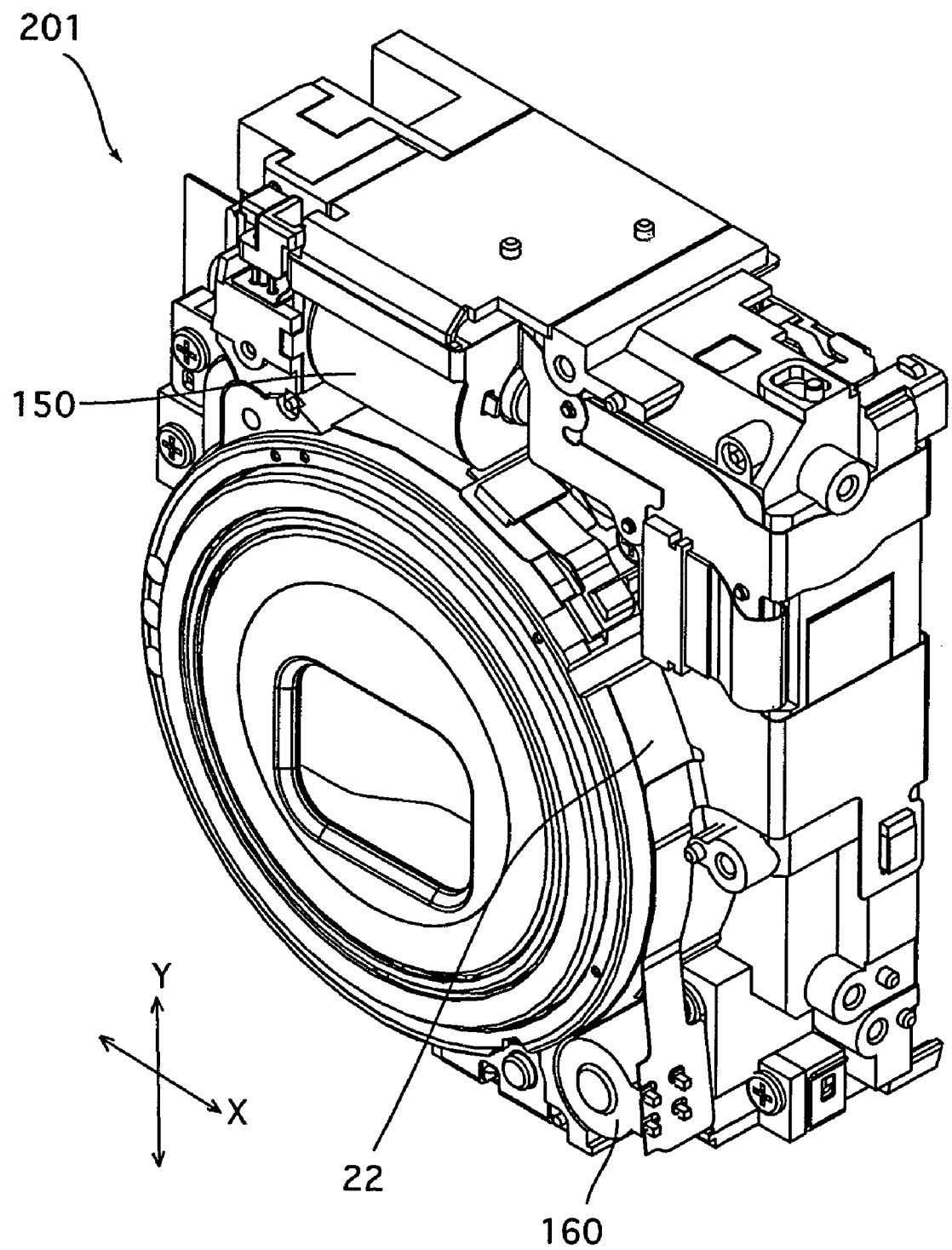
FIG. 4 is a perspective view of the zoom lens of the digital camera shown in FIG. 1 in the fully-retracted state of the zoom lens.

As shown in FIG. 4, the digital camera 200 is provided on the stationary barrel 22 with a zoom motor 150 which is supported by the stationary barrel 22. The driving force of the zoom motor 150 is transferred to a zoom gear 28 (see FIG. 5) via a reduction gear train (not shown). The zoom gear 28 is rotatably fitted on a zoom gear shaft 29 extending parallel to the photographing optical axis Z1. Front and rear ends of the zoom gear shaft 29 are fixed to the stationary barrel 22 and the stationary holder 23, respectively.

The helicoid ring 18 is positioned inside the stationary barrel 22 and supported thereby. The helicoid ring 18 is rotated by rotation of the zoom gear 28. The helicoid ring 18 is moved forward and rearward in the optical axis direction while being rotated about the lens barrel axis Z0 via a helicoid structure (provided between the helicoid ring 18 and the stationary barrel 22) within a predetermined range in the optical axis direction between the position in the fully-retracted state of the zoom lens 201 shown in FIG. 3 to the position in the state of the zoom lens 201 immediately before the zoom lens 201 is in the ready-to-photograph state thereof at the wide-angle extremity shown by the upper half of the zoom lens 201 in FIG. 2. In a ready-to-photograph state of the zoom lens 201 shown in FIG. 2 (between the wide-angle extremity and the telephoto extremity), the helicoid ring 18 is rotated at a fixed position without moving in the optical axis direction. The first movable barrel 15 is coupled to the helicoid ring 18 to be rotatable together with the helicoid ring 18 about the lens barrel axis Z0 and to be movable together with the helicoid ring 18 in the optical axis direction.

The first linear guide ring 14 is positioned inside the first movable barrel 15 and the helicoid ring 18 and supported thereby. The first linear guide ring 14 is guided linearly in the optical axis direction via linear guide grooves formed on the stationary barrel 22, and is engaged with the first movable barrel 15 and the helicoid ring 18 to be rotatable about the lens barrel axis Z0 relative to the first movable barrel 15 and the helicoid ring 18, and to be movable in the optical axis direction together with the first movable barrel 15 and the helicoid ring 18.

As shown in FIG. 5, the first linear guide ring 14 is provided with a set of three through-slots 14a (only two of which appear in FIG. 5) which radially penetrate the first linear guide ring 14. Each through-slot 14a includes a circumferential slot portion and an inclined lead slot portion which extends obliquely rearward from one end of the circumferential slot portion. The inclined lead slot portion is inclined with respect to the optical axis direction, while the circumferential slot portion extends circumferentially about the lens barrel axis Z0. A set of three followers 11a (only two of which appear in FIG. 6) which project radially outward from an outer peripheral surface of the cam ring 11 are engaged in the set of three through-slots 14a, respectively. The set of three followers 11a are further engaged in a set of three rotation transfer grooves 15a which are formed on an inner peripheral surface of the first movable barrel 15 and extend parallel to the photographing optical axis Z1 so that the cam ring 11 rotates with the first movable barrel 15. When the set of three followers 11a are engaged in the lead slot portions of the set of three through-slots 14a, respectively, the cam ring 11 is moved forward and rearward in the optical axis direction while being rotated about the lens barrel axis Z0 and guided by the set of three through-slots 14a. On the other hand, when the set of three followers 11a are engaged in the circumferential slot portions of the set of three through-slots 14a, respectively, the cam ring 11 is rotated at a fixed position without moving in the optical axis direction. Similar to the helicoid ring 18, the cam ring 11 is moved forward and rearward in the optical axis direction while being rotated about the lens barrel axis Z0 within a predetermined range in the optical axis direction between the position in the fully-retracted state of the zoom lens 201 shown in FIG. 3 to the position in the state of the zoom lens 201 immediately before the zoom lens 201 enters the ready-to-photograph state thereof at the wide-angle extremity (shown by the upper half of the zoom lens 201 in FIG. 2), and the cam ring 11 is rotated at a fixed position without moving in the optical axis direction in a ready-to-photograph state of the zoom lens 201 shown in FIG. 2 (between the wide-angle extremity and the telephoto extremity).

The first linear guide ring 14 guides the second linear guide ring 10 and the second movable ring 13 linearly in the optical axis direction by linear guide grooves which are formed on an inner peripheral surface of the first linear guide ring 14 to extend parallel to the photographing optical axis Z1. The second linear guide ring 10 guides a second lens group moving frame 8, which indirectly supports the second lens group LG2, linearly in the optical axis direction, while the second movable barrel 13 guides the third movable barrel 12, which indirectly supports the first lens group LG1, linearly in the optical axis direction. Each of the second linear guide ring 10 and the second movable barrel 13 is supported by the cam ring 11 to be rotatable relative to the cam ring 11 about the lens barrel axis Z0 and to be movable together with the cam ring 11 in the optical axis direction.

The cam ring 11 is provided on an inner peripheral surface thereof with a plurality of inner cam grooves 11b for moving the second lens group LG2, and the second lens group moving frame 8 is provided on an outer peripheral surface thereof with a plurality of cam followers 8a which are engaged in the plurality of inner cam grooves 11b, respectively. Since the second lens group moving frame 8 is guided linearly in the optical axis direction without rotating via the second linear guide ring 10, a rotation of the cam ring 11 causes the second lens group moving frame 8 to move in the optical axis direction in a predetermined moving manner in accordance with contours of the plurality of inner cam grooves 11b.

As shown in FIG. 6, the zoom lens 201 is provided inside the second lens group moving frame 8 with a second lens frame 6 which supports and holds the second lens group LG2. The second lens frame 6 is supported by the second lens group moving frame 8 to be rotatable (swingable) about a pivot shaft 33. The pivot shaft 33 extends parallel to the photographing optical axis Z1. The second lens frame 6 is swingable about the pivot shaft 33 between a photographing position (shown in FIG. 2) where the second lens group LG2 is positioned on the photographing optical axis Z1, and a radially retracted position (shown in FIG. 3) where the optical axis of the second lens group LG2 is retracted away from the photographing optical axis Z1 to be positioned above the photographing optical axis Z1. The second lens frame 6 is biased to rotate in a direction toward the aforementioned photographing position of the second lens frame 6 by a torsion spring 39. The stationary holder 23 is provided with a position-control cam bar (second lens frame removing device) 23a (see FIG. 5) which projects forward from the stationary holder 23 to be engageable with the second lens frame 6 so that the position-control cam bar 23a comes into pressing contact with the second lens frame 6 to rotate the second lens frame 6 to the radially retracted position thereof against the biasing force of the torsion spring 39 when the second lens group moving frame 8 moves rearward in a retracting direction to approach the stationary holder 23.

The second movable barrel 13, which is guided linearly in the optical axis direction without rotating by the second linear guide ring 10, guides the third movable barrel 12 linearly in the optical axis direction. The third movable barrel 12 is provided on an inner peripheral surface thereof with a set of three cam followers 31 (see FIG. 6) which project radially inwards, and the cam ring 11 is provided on an outer peripheral surface thereof with a set of three outer cam grooves 11c (cam grooves for moving the first lens group LG1; only two of them appear in FIG. 6) in which the set of three cam followers 31 are slidably engaged, respectively. The zoom lens 201 is provided inside the third movable barrel 12 with a first lens frame 1 which is supported by the third movable barrel 12 via a first lens group adjustment ring 2.

The zoom lens 201 is provided between the first and second lens groups LG1 and LG2 with a shutter unit 100 including the shutter S and the adjustable diaphragm A. The shutter unit 100 is positioned inside the second lens group moving frame 8 and fixed thereto.

Operations of the zoom lens 201 that has the above described structure will be discussed hereinafter. In the state shown in FIG. 3, in which the zoom lens 201 is in the fully-retracted state, the zoom lens 201 is fully accommodated in the camera body 202. Upon a main switch 101 (see FIG. 25) provided on an outer surface of the camera body 202 being turned ON in the fully-retracted state of the zoom lens 201 shown in FIG. 3, the zoom motor 150 is driven to rotate in a lens barrel advancing direction by control of a control circuit 102 (see FIG. 25) provided in the camera body 202. This rotation of the zoom motor 150 rotates the zoom gear 28. The rotation of the zoom gear 28 causes a combination of the first movable barrel 15 and the helicoid ring 18 to move forward while rotating about the lens barrel axis Z0 due to the aforementioned helicoid structure, and further causes the first linear guide ring 14 to move forward linearly together with the first movable barrel 15 and the helicoid ring 18. At this time, the cam ring 11 which rotates by rotation of the first movable barrel 15 moves forward in the optical axis direction by an amount of movement corresponding to the sum of the amount of the forward movement of the first linear guide ring 14 and the amount of the forward movement of the cam ring 11 by a leading structure between the first linear guide ring 14 and the cam ring 11, i.e., by the engagement of the inclined lead slot portions of the set of three through-slots 14a and the set of three followers 11a of the cam ring 11, respectively. Once the helicoid ring 18 and the cam ring 11 advance to respective predetermined points thereof, the functions of a rotating/advancing mechanism (the aforementioned helicoid structure) between the helicoid ring 18 and the stationary barrel 22) and another rotating/advancing mechanism (the aforementioned leading structure) between the cam ring 11 and the first linear guide ring 14 are canceled, so that each of the helicoid ring 18 and the cam ring 11 rotates about the lens barrel axis Z0 without moving in the optical axis direction.

A rotation of the cam ring 11 causes the second lens group moving frame 8, which is positioned inside the cam ring 11 and guided linearly in the optical axis direction via the second linear guide ring 10, to move in the optical axis direction with respect to the cam ring 11 in a predetermined moving manner due to the engagement of the set of three cam followers 8a with the set of three inner cam grooves 11b, respectively. In the state shown in FIG. 3, in which the zoom lens 201 is in the fully-retracted state, the second lens frame 6, which is positioned inside the second lens group moving frame 8, is held in the radially retracted position off the photographing optical axis Z1 by the action of the position-control cam bar 23a, which projects forward from the stationary holder 23. During the course of movement of the second lens group moving frame 8 from the retracted position to a position in the zooming range, the second lens frame 6 is disengaged from the position-control cam bar 23a to rotate about the pivot shaft 33 from the radially retracted position to the photographing position shown in FIG. 2, where the optical axis of the second lens group LG2 coincides with the photographing optical axis Z1, by the spring force of the torsion spring 39. Thereafter, the second lens frame 6 remains held in the photographing position until the zoom lens 201 is retracted into the camera body 201.

In addition, a rotation of the cam ring 11 causes the third movable barrel 12, which is positioned around the cam ring 11 and guided linearly in the optical axis direction via the second movable barrel 13, to move in the optical axis direction relative to the cam ring 11 in a predetermined moving manner due to the engagement of the set of three cam followers 31 with the set of three outer cam grooves 11c of the cam ring 11, respectively.

Accordingly, an axial position of the first lens group LG1 relative to a picture plane (imaging surface/light receiving surface of the CCD image sensor 60) when the first lens group LG1 is moved forward from the fully-retracted position is determined by the sum of the amount of forward movement of the cam ring 11 relative to the stationary barrel 22 and the amount of movement of the third external barrel 12 relative to the cam ring 11, while an axial position of the second lens group LG2 relative to the picture plane when the second lens group LG2 is moved forward from the fully-retracted position is determined by the sum of the amount of forward movement of the cam ring 11 relative to the stationary barrel 22 and the amount of movement of the second lens group moving frame 8 relative to the cam ring 11. A zooming operation is carried out by moving the first and second lens groups LG1 and LG2 on the photographing optical axis Z1 while changing the air distance therebetween. When the zoom lens 201 is driven to advance from the fully-retracted position shown in FIG. 3, the zoom lens 201 firstly moves to a position shown above the photographing lens axis Z1 in FIG. 2 in which the zoom lens 201 is at the wide-angle extremity. Subsequently, the zoom lens 201 moves a position state shown below the photographing lens axis Z1 in FIG. 2 in which the zoom lens 201 is at the telephoto extremity by a further rotation of the zoom motor 150 in a lens barrel advancing direction thereof. As can be seen from FIG. 2, the space between the first and second lens groups LG1 and LG2 when the zoom lens 201 is at the wide-angle extremity is greater than when the zoom lens 201 is at the telephoto extremity. When the zoom lens 201 is at the telephoto extremity as shown below the photographing lens axis Z1 in FIG. 2, the first and second lens groups LG1 and LG2 have moved to approach each other to have some space therebetween which is smaller than the space in the zoom lens 201 at the wide-angle extremity. This variation of the air distance between the first and second lens groups LG1 and LG2 for the zooming operation is achieved by contours of the plurality of inner cam grooves 11b (for moving the second lens group LG2) and the set of three outer cam grooves 11c (for moving the first lens group LG1) of the cam ring 11. In the zooming range between the wide-angle extremity and the telephoto extremity, the cam ring 11, the first movable barrel 15 and the helicoid ring 18 rotate at their respective axial fixed positions, i.e., without moving in the optical axis direction.

In a ready-to-photograph state of the zoom lens 201 between the wide-angle extremity and the telephoto extremity, a focusing operation is carried out by moving the third lens group LG3 (the third lens frame 51) along the photographing optical axis Z1 by driving the AF motor 160 in accordance with object distance information obtained by a distance measuring device of the digital camera 200.

Upon the main switch 101 being turned OFF, the zoom motor 150 is driven to rotate in a lens barrel retracting direction so that the zoom lens 201 operates in the reverse manner to the above described advancing operation to fully retract the zoom lens 201 into the camera body 202 as shown in FIG. 3. During the course of this retracting movement of the zoom lens 201, the second lens frame 6 rotates about the pivot shaft 33 to the radially retracted position by the position-control cam bar 23a while moving rearward together with the second lens group moving frame 8. When the zoom lens 201 is fully retracted into the camera body 202, the second lens group LG2 is retracted into the space radially outside the space in which the third lens group LG3, the low-pass filter LG4 and the CCD image sensor 60 are retracted as shown in FIG. 3, i.e., the second lens group LG2 is radially retracted into an axial range substantially identical to an axial range in the optical axis direction in which the third lens group LG3, the low-pass filter LG4 and the CCD image sensor 60 are positioned. This structure of the digital camera 200 for retracting the second lens group LG2 in this manner reduces the length of the zoom lens 201 when the zoom lens 201 is fully retracted, thus making it possible to reduce the thickness of the camera body 202 in the optical axis direction, i.e., in the horizontal direction as viewed in FIG. 3.

Figure 7:
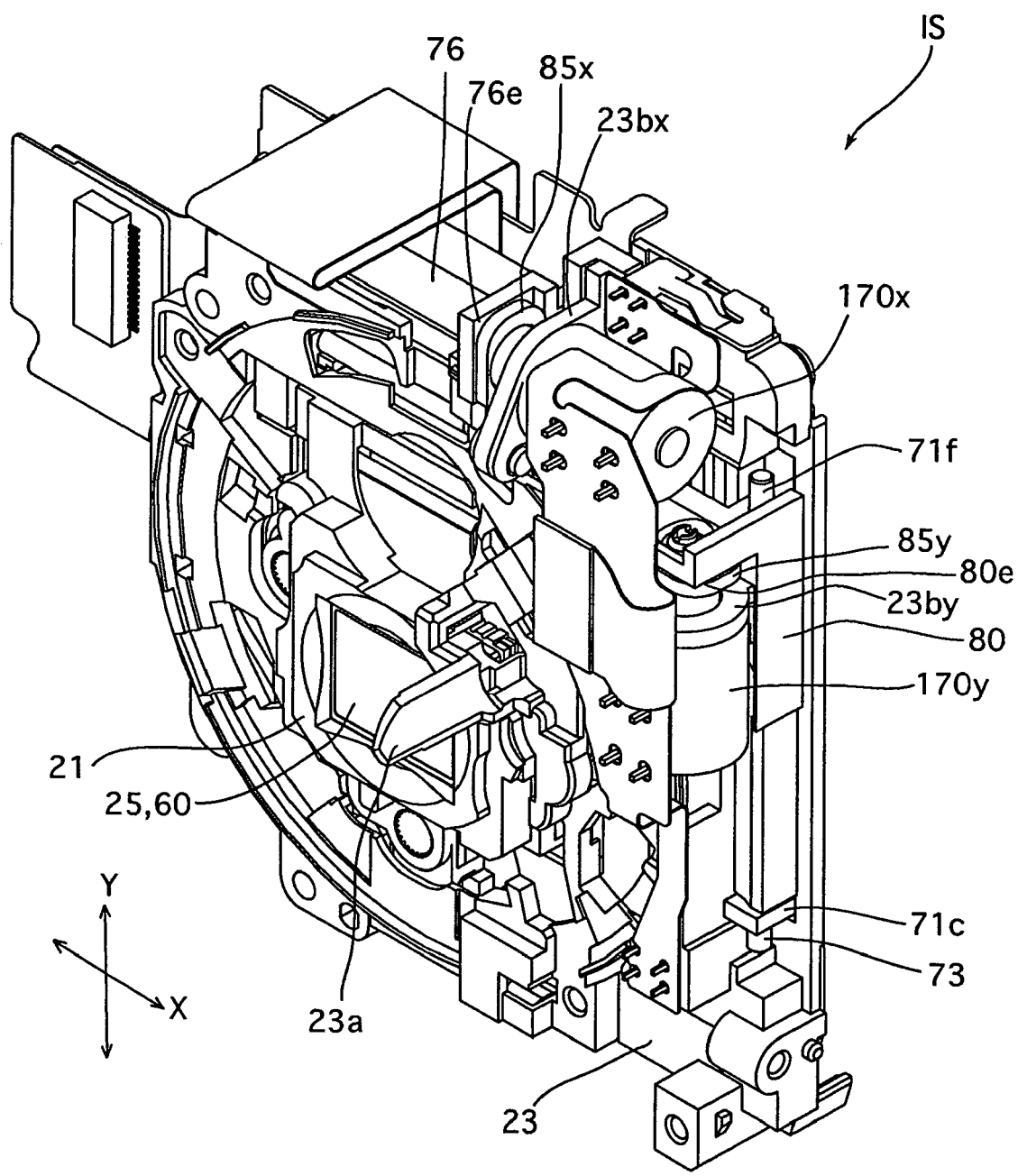
FIG. 7 is a front perspective view of an image stabilizing unit (image stabilizing mechanism) shown in FIG. 5.
Figure 8:
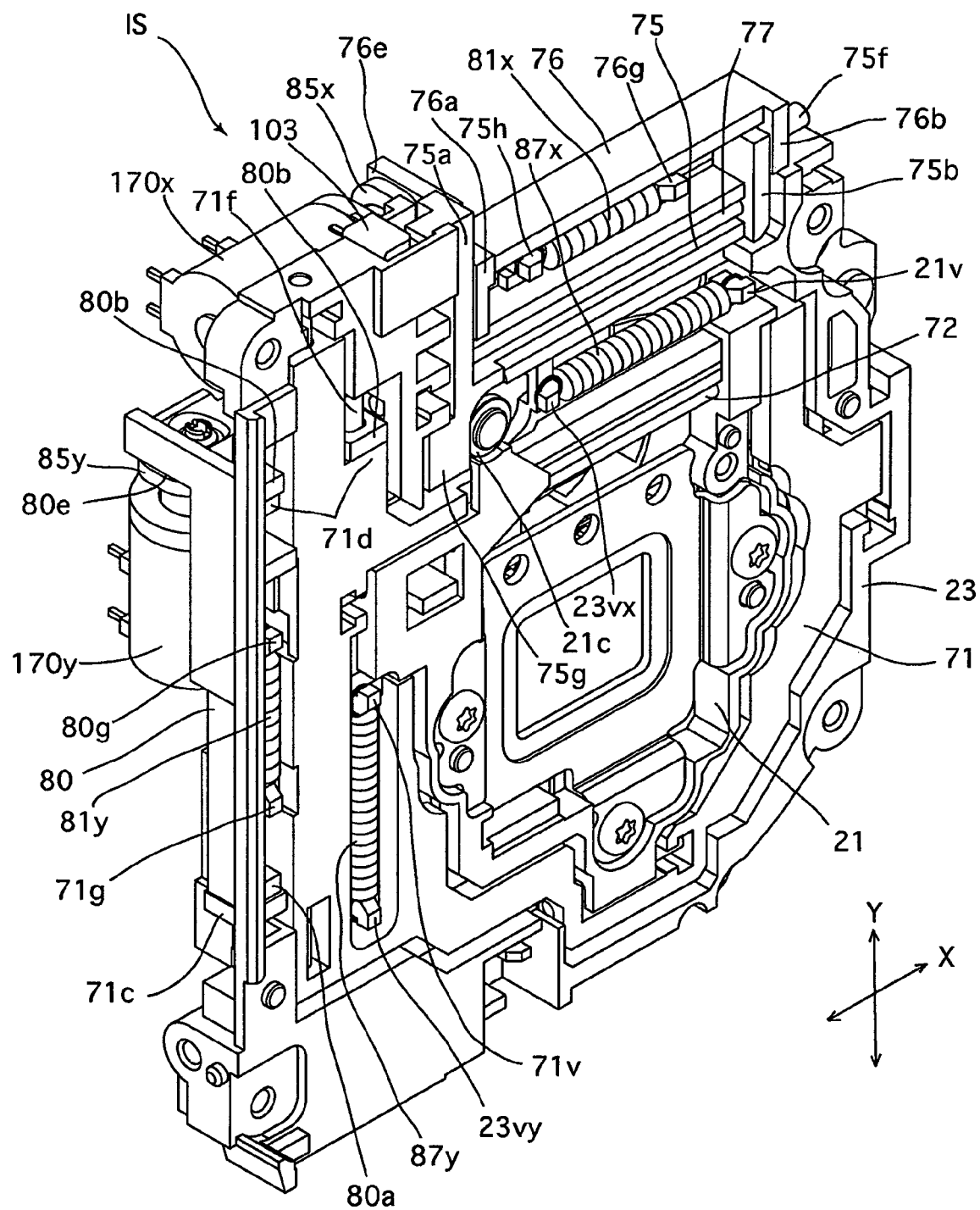
FIG. 8 is a rear perspective view of the image stabilizing unit shown in FIG. 5.
Figure 9:
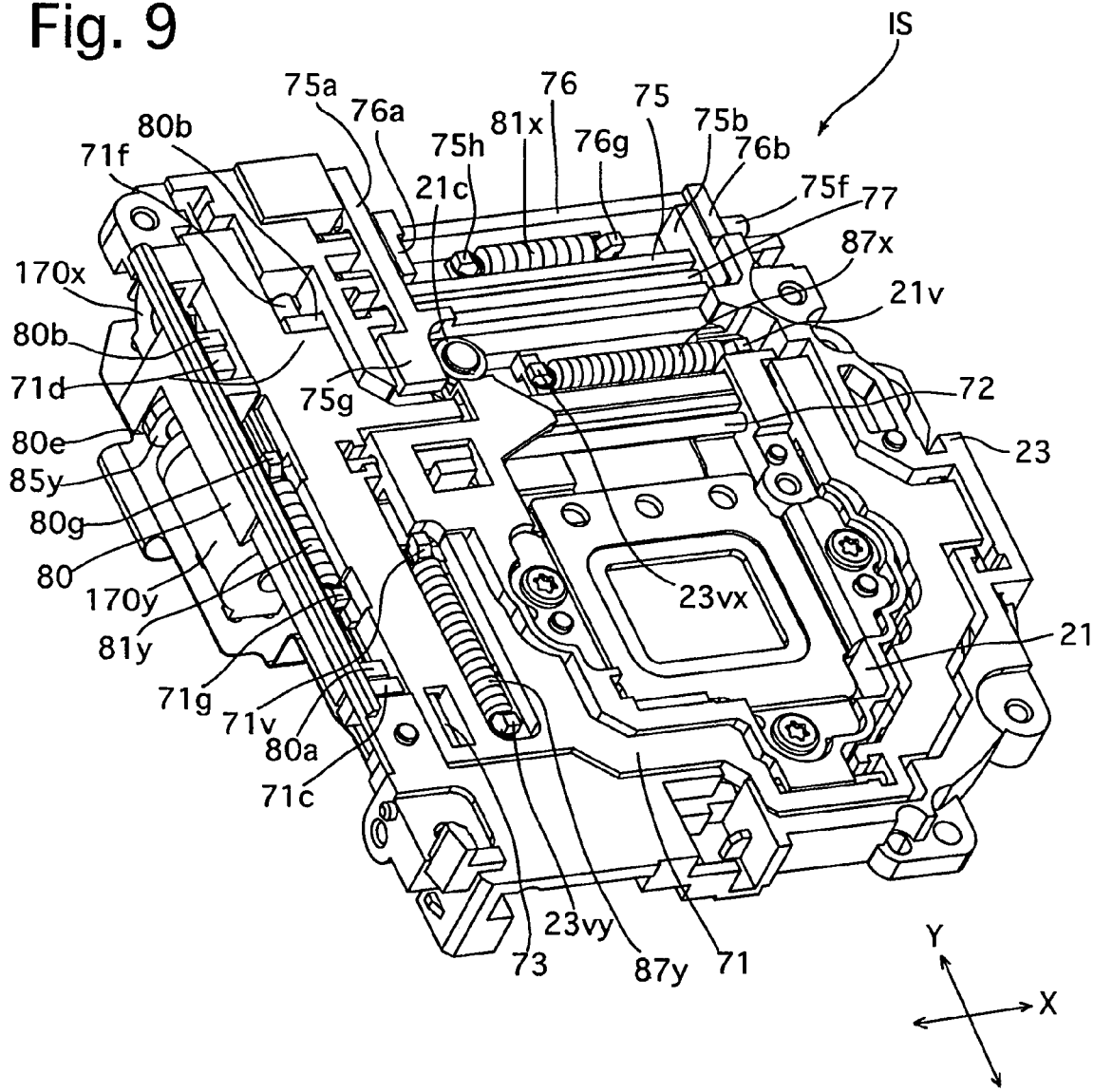
FIG. 9 is a rear perspective view of the image stabilizing unit shown in FIG. 5, viewed from an angle different from the angle of FIG. 8.
Figure 10:
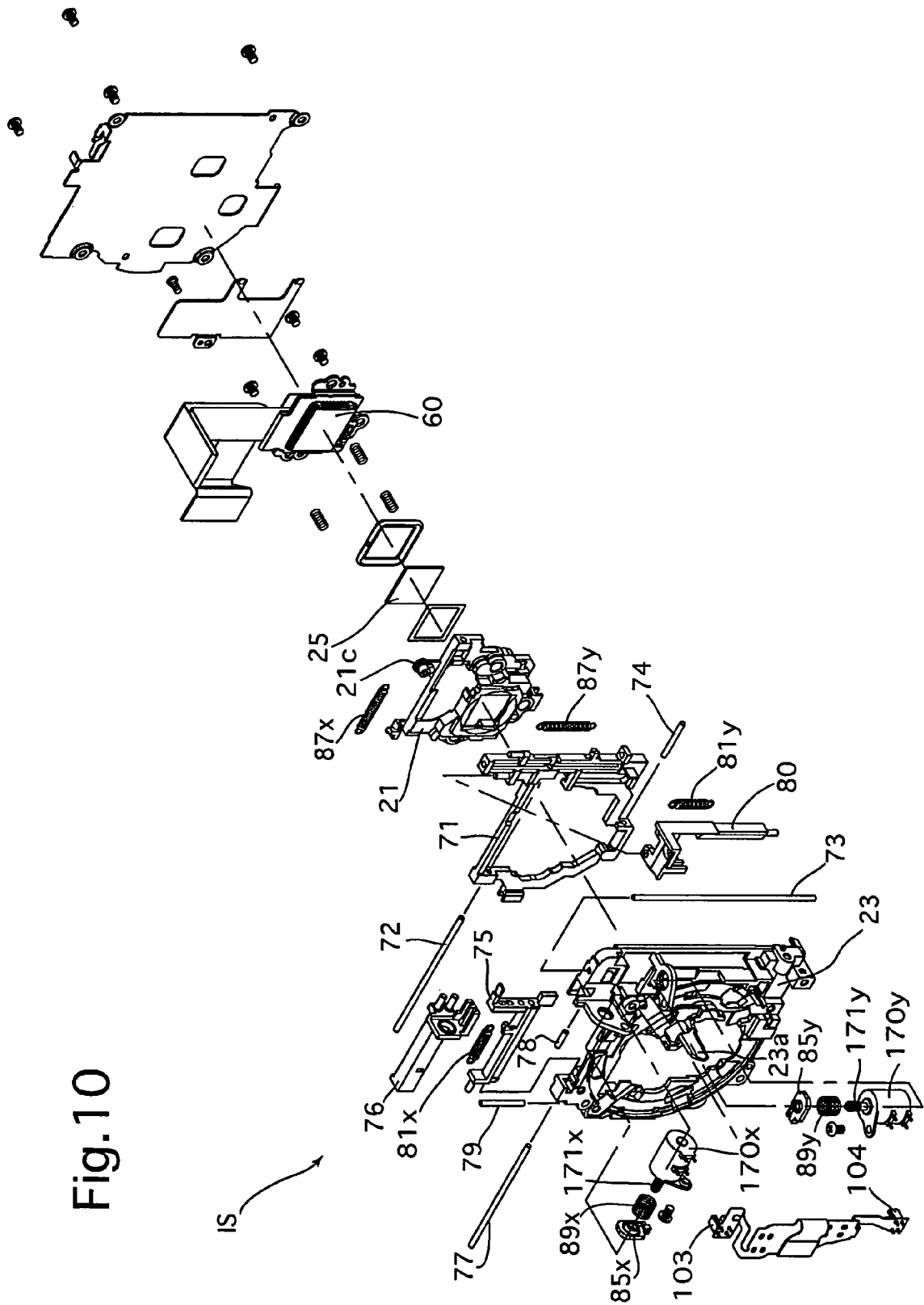
FIG. 10 is an exploded perspective view of the image stabilizing unit.
Figure 25:
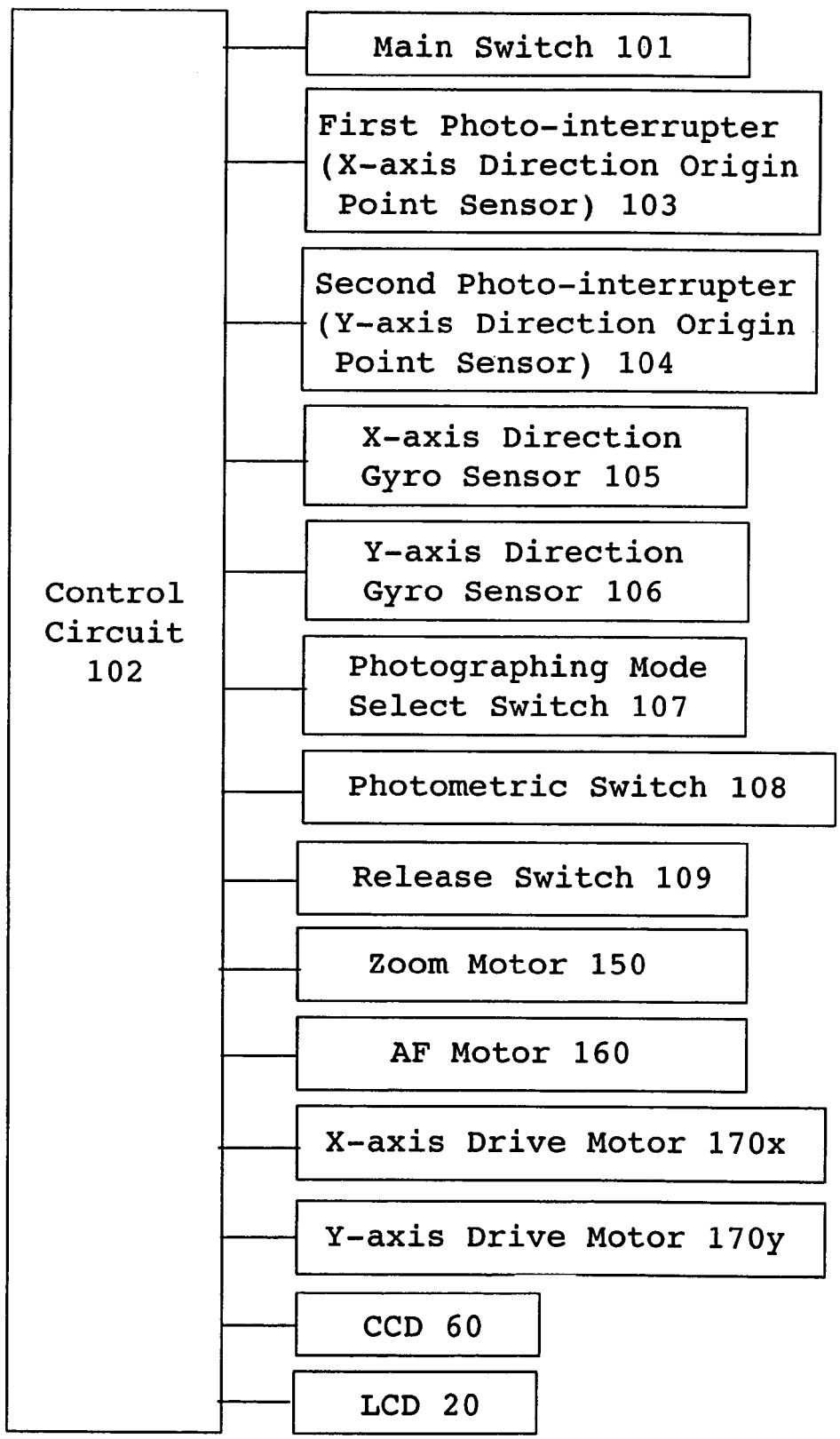
FIG. 25 is a block diagram illustrating a configuration of electrical circuits of the digital camera shown in FIGS. 1 through 3.

The digital camera 200 is provided with an image stabilizer (optical image stabilizer). This image stabilizer moves the CCD image sensor 60 in a plane orthogonal to the photographing optical axis Z1 to counteract image shake of an object image captured by the CCD image sensor 60 in accordance with the direction and the magnitude of vibration (hand shake) applied to the digital camera 200. This control is performed by the control circuit 102 (FIG. 25). FIGS. 7 through 9 show an image stabilizing unit IS including the CCD image sensor 60. FIG. 10 is an exploded perspective view of the entire image stabilizing unit IS and FIGS. 11 through 23 are perspective views or exploded perspective views of various portions of the image stabilizing unit IS.

The stationary holder 23 is provided with a pair of Y-axis direction guide rods (guide device) 73 and 79 which extend in the Y-axis direction (the vertical direction of the digital camera 200). The Y-axis direction moving stage 71 is provided with a guide hole 71a and a guide groove 71b (see FIG. 16) in which the pair of Y-axis direction guide rods 73 and 79 are engaged so that the Y-axis direction moving stage 71 is supported by the pair of Y-axis direction guide rods 73 and 79 to be freely slidable thereon, respectively. A pair of X-axis direction guide rods (guide device) 72 and 74 are fixed to the Y-axis direction moving stage 71 to extend in the X-axis direction (the horizontal direction of the digital camera 200) that is perpendicular to the Y-axis direction. The X-axis direction stage 21 is provided with a guide hole 21a and a guide groove 21b (see FIGS. 12 and 13) in which the pair of X-axis direction guide rods 72 and 74 are engaged so that the X-axis direction moving stage 21 is freely slidable thereon, respectively. Accordingly, the CCD image sensor 60 is supported by the stationary holder 23 via the Y-axis direction moving stage 71 and the X-axis direction moving stage 21 to be movable in two axial directions orthogonal to each other in a plane orthogonal to the photographing optical axis Z1. The range of movement of the X-axis direction stage 21 is defined by inner peripheral surfaces of the Y-axis direction moving stage 71, while the range of movement of the Y-axis direction moving stage 71 is defined by inner peripheral surfaces of the stationary holder 23.

The image stabilizing unit IS is provided with an X-axis direction stage biasing spring (second biasing device) 87x which is extended and installed between a spring hook 21v formed on the X-axis direction stage 21 and a spring hook 23vx formed on the stationary holder 23. The X-axis direction stage biasing spring 87x is an extension coil spring and biases the X-axis direction stage 21 rightward as viewed from the front of the zoom lens 201 (leftward as viewed from the rear of the zoom lens 201). The image stabilizing unit IS is provided with a Y-axis direction stage biasing spring (second biasing device) 87y which is extended and installed between a spring hook 71v formed on the Y-axis direction stage 71 and a spring hook 23vy formed on the stationary holder 23. The Y-axis direction stage biasing spring 87y is an extension coil spring and biases the Y-axis direction stage 71 downward.

Figure 16:
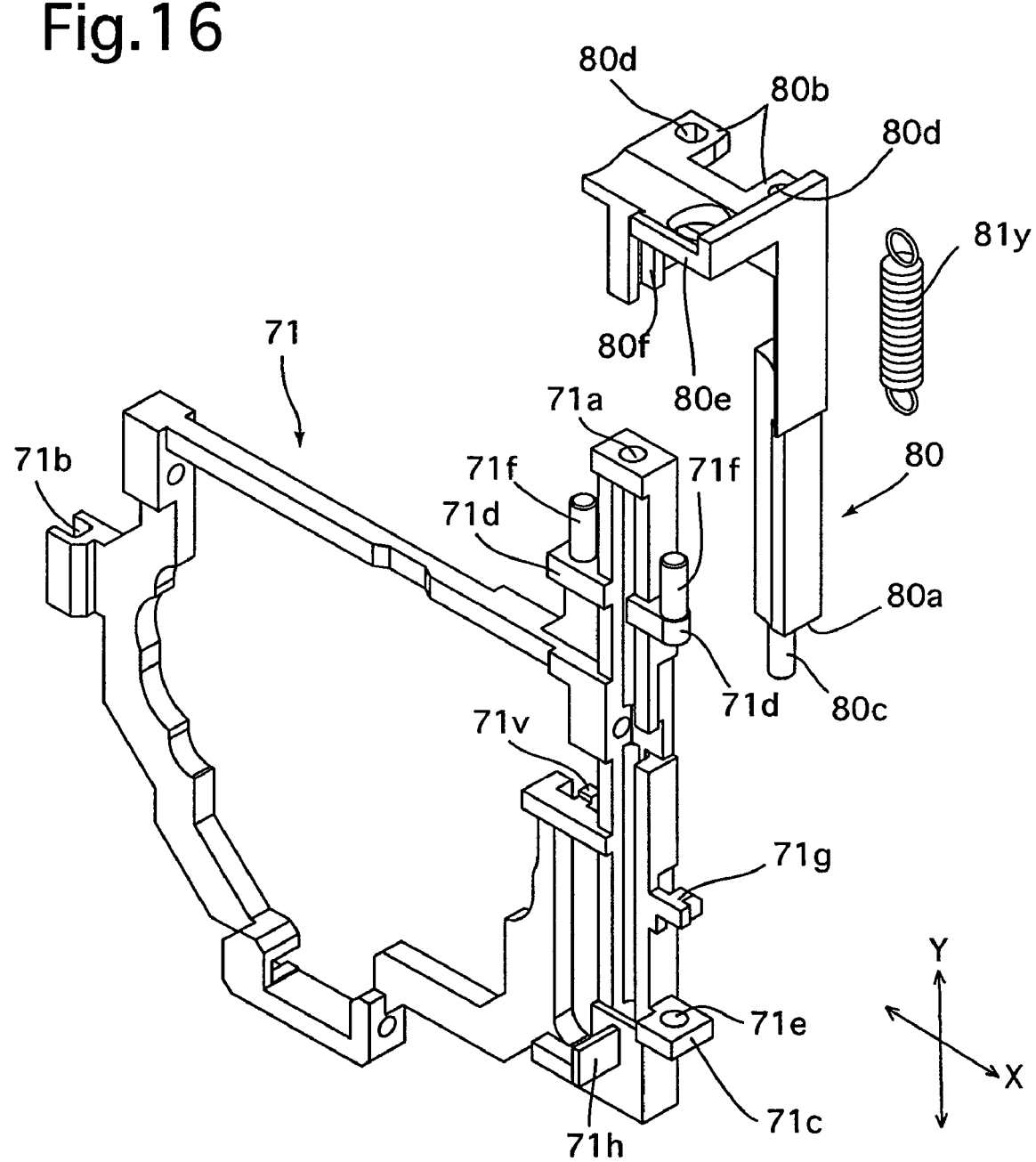
FIG. 16 is an exploded perspective view of a Y-axis direction moving member, a Y-axis direction moving stage and an associated extension joining spring of the image stabilizing unit.
Figure 17:
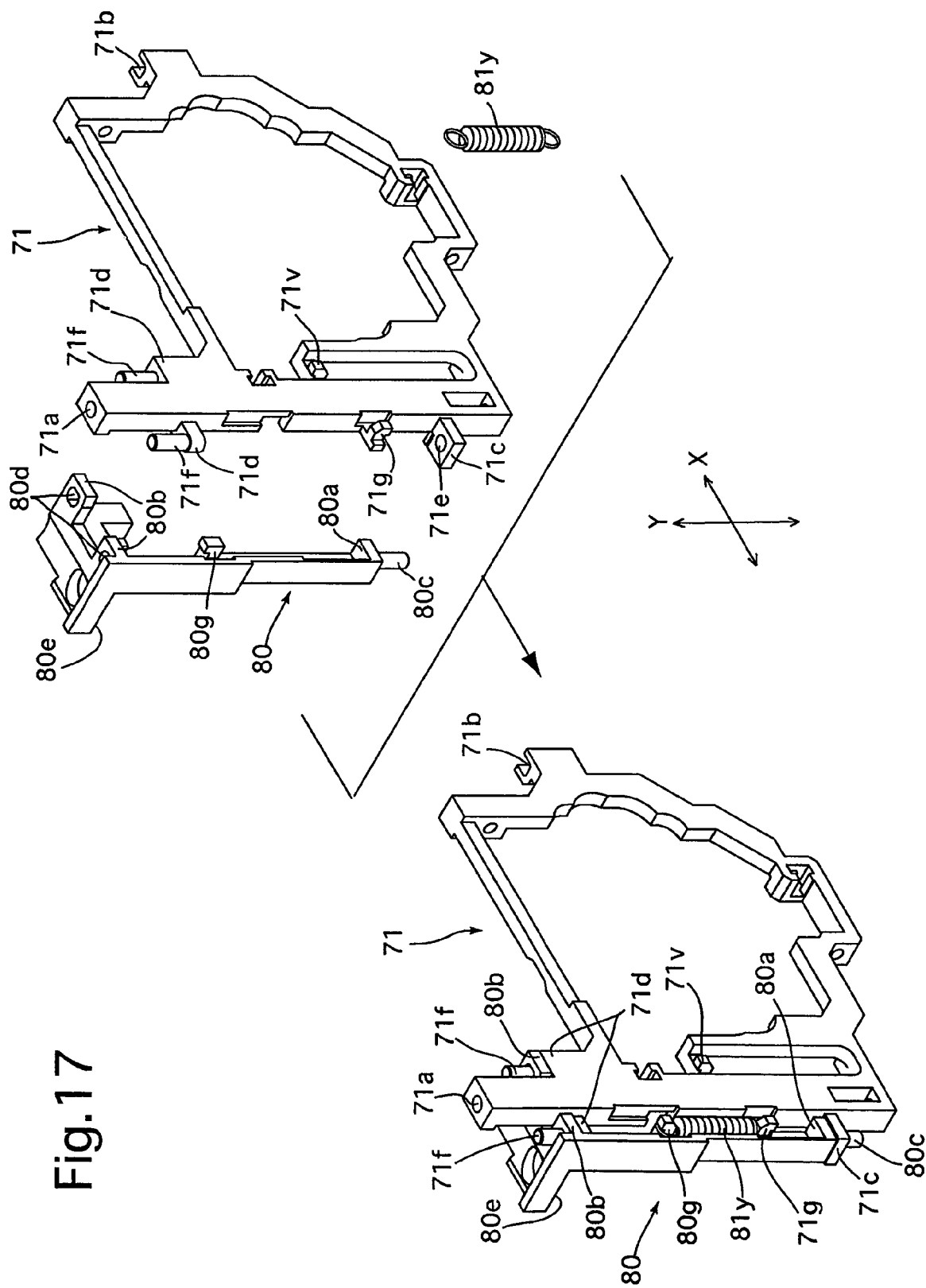
FIG. 17 is a rear perspective view of the Y-axis direction moving member, the Y-axis direction moving stage and the associated extension joining spring that are shown in FIG. 16, showing an exploded state and an assembled state thereof.

As shown in FIGS. 16 and 17, the image stabilizing unit IS is provided on one side of the Y-axis direction stage 71 with a Y-axis direction moving member (first moving element) 80 which is supported by the Y-axis direction stage 71. The Y-axis direction moving member 80 is elongated in the Y-axis direction and provided in the vicinity of upper and lower ends of the Y-axis direction moving member 80 with a movement limit lug (movement limit portion) 80a and a movement limit lug (movement limit portion) 80b, respectively. The Y-axis direction moving member 80 is provided at a lower end thereof with a guide pin 80c which extends downward from the movement limit lug 80a. The movement limit lug 80b is provided with a pair of guide holes 80d. The Y-axis direction moving member 80 is further provided in the vicinity of the pair of guide holes 80d with a nut contacting portion 80e and a linear groove 80f (see FIG. 16), and is further provided, on a vertically straight portion of the Y-axis direction moving member 80 between the movement limit lug 80a and the movement limit lug 80b, with a spring hook 80g (see FIG. 17). The linear groove 80f is elongated in the Y-axis direction.

The Y-axis direction stage 71 is provided with a movement limit lug (movement limit portion) 71c and a movement limit lug (movement limit portion) 71d which face the movement limit lug 80a and the movement limit lug 80b of the Y-axis direction moving member 80, respectively. The movement limit lug 71c is provided with a guide hole 71e in which the guide pin 80c is slidably engaged, and the movement limit lug 71d is provided with a pair of guide pins 71f which extend upward to be slidably engaged in the pair of guide holes 80d, respectively. The Y-axis direction stage 71 is provided on a vertically straight portion thereof between the movement limit lug 71c and a movement limit lug 71d, with a spring hook 71g.

The Y-axis direction stage 71 and the Y-axis direction moving member 80 are guided to be movable relative to each other in the Y-axis direction by the engagement of the guide hole 71e with the guide pin 80c and the engagement of the pair of guide pins 71f with the pair of guide holes 80d. The image stabilizing unit IS is provided with an extension joining spring (first biasing device) 81y which is extended and installed between the spring hook 71g of the Y-axis direction stage 71 and the spring hook 80g of the Y-axis direction moving member 80. The extension joining spring 81y biases the Y-axis direction stage 71 and the Y-axis direction moving member 80 in opposite directions to bring the movement limit lug 80a the movement limit lug 71c into contact with each other and to bring the movement limit lug 80b the movement limit lug 71d into contact with each other, i.e., in opposite directions to move the Y-axis direction stage 71 and the Y-axis direction moving member 80 upward and downward, respectively.

Figure 14:
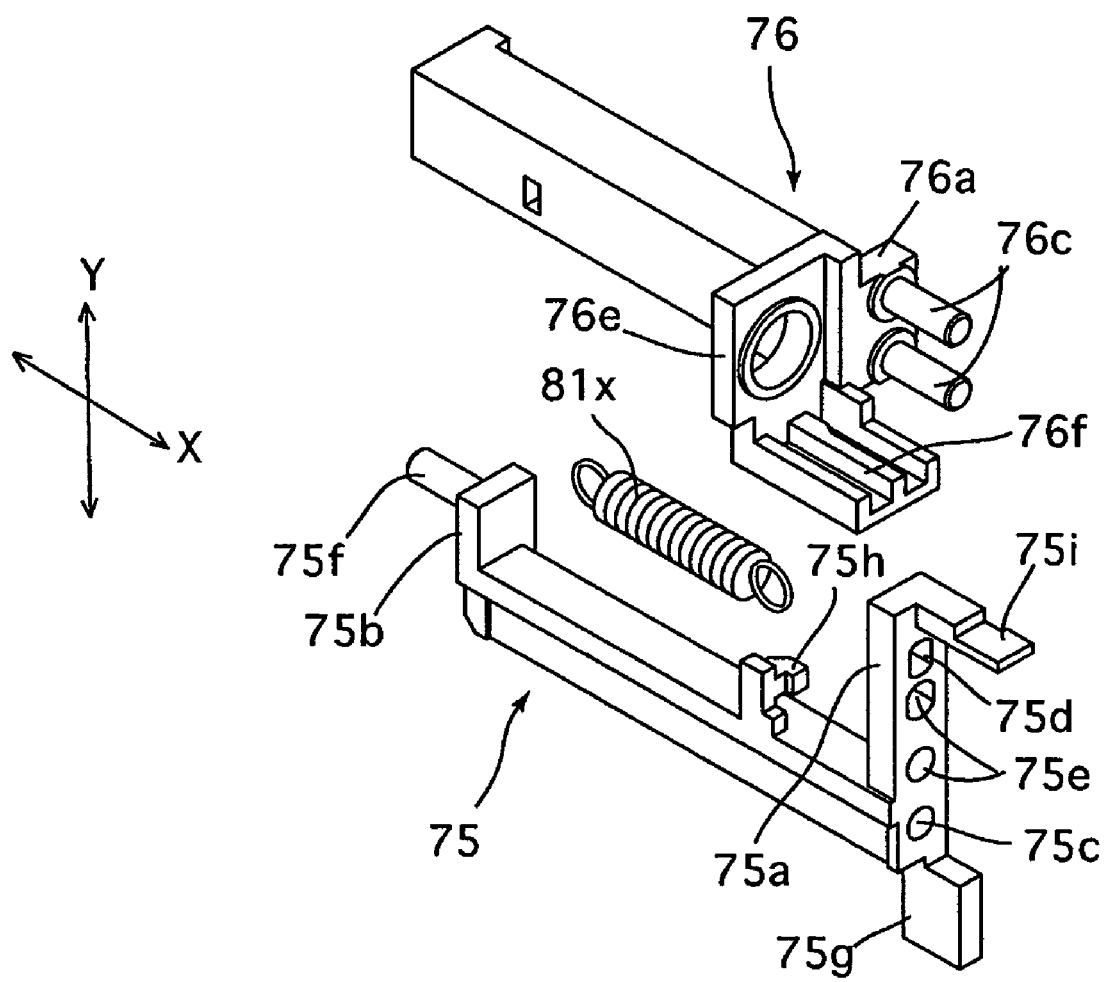
FIG. 14 is a front perspective view of a first X-axis direction moving member, a second X-axis direction moving member and an associated extension joining spring of the image stabilizing unit, showing an exploded state thereof.
Figure 15:
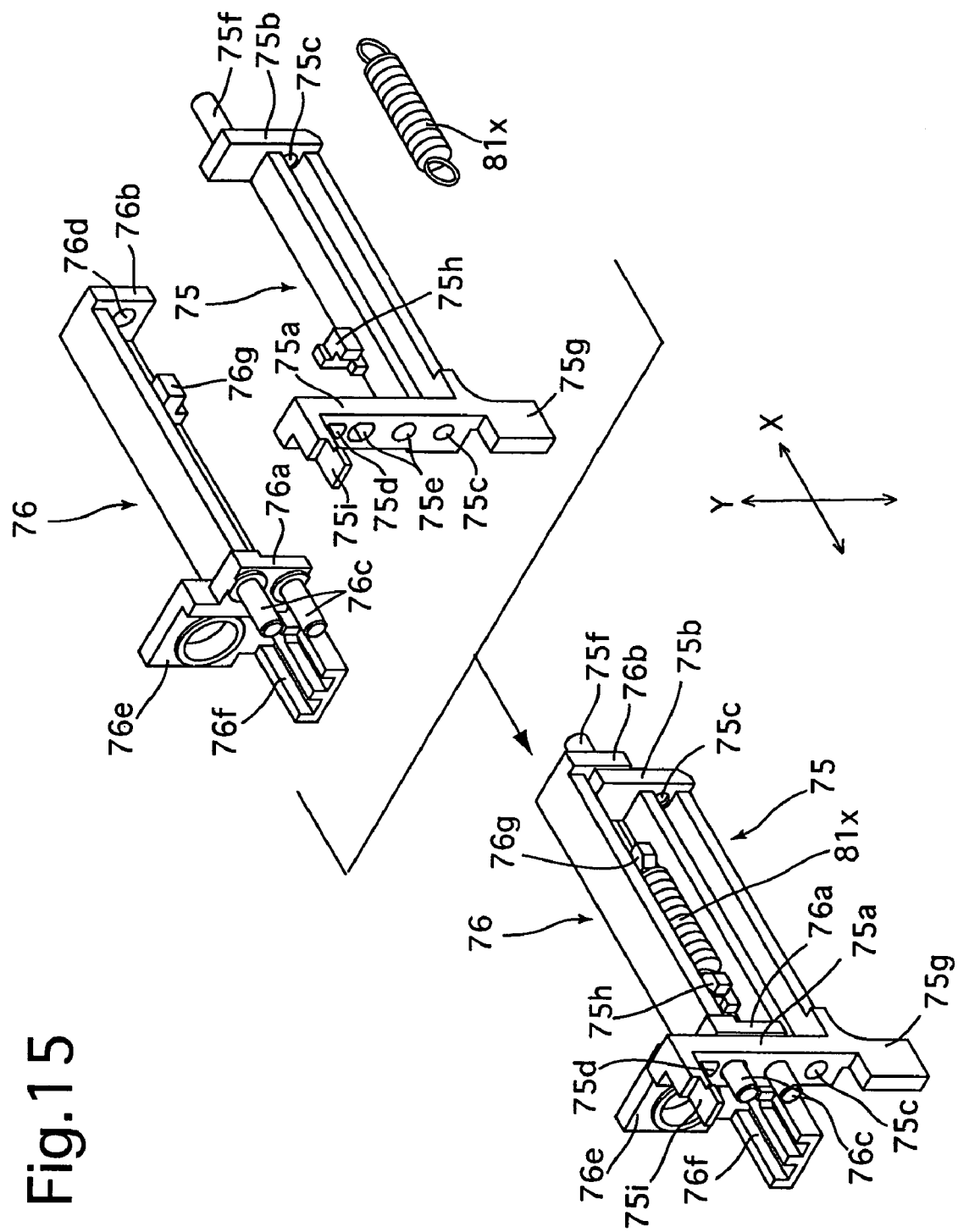
FIG. 15 is a rear perspective view of the first X-axis direction moving member, the second X-axis direction moving member and the associated extension joining spring that are shown in FIG. 14, showing an exploded state and an assembled state thereof.

Another pair of X-axis direction guide rods 77 and 78 that are different from the pair of X-axis direction guide rods 72 and 74 are fixed to the stationary holder 23 to extend in the X-axis direction. The image stabilizing unit IS is provided with a first X-axis direction moving member (second moving element) 75 which is supported by the stationary holder 23 via the pair of X-axis direction guide rods 77 and 78 to be freely slidable thereon. As shown in FIGS. 14 and 15, the first X-axis direction moving member 75 is elongated in the X-axis direction, and is provided, in the vicinity of opposite ends of the first X-axis direction moving member 75 in the X-axis direction, with a movement limit lug (movement limit portion) 75a and a movement limit lug (movement limit portion) 75b, respectively. A pair of guide holes 75c in which the X-axis direction guide rod 77 is inserted are formed on the movement limit lugs 75a and 75b, respectively, to be aligned in the X-axis direction. A guide hole 75d in which the X-axis direction guide rod 78 is inserted is formed on the movement limit lug 75a. No guide hole corresponding to the guide hole 75d is formed on the movement limit lug 75b. The movement limit lug 75a is provided between the associated guide hole 75c and the guide hole 75d with a pair of guide holes 75e. The movement limit lug 75b is provided, above the associated guide hole 75c in the Y-axis direction (see FIG. 15), with a guide pin 75f which extends in the X-axis direction in a direction away from the movement limit lug 75a. The first X-axis direction moving member 75 is further provided at the bottom of the movement limit lug 75a with a linkage projection 75g, and is further provided, on a horizontally straight portion of the first X-axis direction moving member 75 between the movement limit lug 75a and a movement limit lug 75b, with a spring hook 75h.

The image stabilizing unit IS is provided on the first X-axis direction moving member 75 with a second X-axis direction moving member (first moving element) 76. The second X-axis direction moving member 76 is provided with a movement limit lug (movement limit portion) 76a and a movement limit lug (movement limit portion) 76b which are separate from each other in the X-axis direction. The movement limit lug 76a is provided with a pair of guide pins 76c which extend in the X-axis direction to be slidably engaged in the pair of guide holes 75e of the first X-axis direction moving member 75, respectively, and the movement limit lug 76b is provided with a guide hole 76d in which the guide pin 75f of the first X-axis direction moving member 75 is slidably engaged. The second X-axis direction moving member 76 is further provided in the vicinity of the movement limit lug 76a with a nut contacting portion 76e and a linear groove 76f (see FIG. 15), and is further provided, on a horizontally straight portion of the second X-axis direction moving member 76 between the movement limit lug 76a and the movement limit lug 76b, with a spring hook 76g. The linear groove 76f is elongated in the Y-axis direction.

The first X-axis direction moving member 75 and the second X-axis direction moving member 76 are guided to be movable relative to each other in the X-axis direction by the engagement of the pair of guide pins 76c with the pair of guide holes 75e and the engagement of the guide pin 75f with the guide hole 76d. The image stabilizing unit IS is provided with an extension joining spring (first biasing device) 81x which is extended and installed between the spring hook 75h of the first X-axis direction moving member 75 and the spring hook 76g of the second X-axis direction moving member 76. The extension joining spring 81x biases the first X-axis direction moving member 75 and the second X-axis direction moving member 76 in opposite directions to bring the movement limit lug 75a and the movement limit lug 76a into contact with each other and to bring the movement limit lug 75b and the movement limit lug 76b into contact with each other.

The linkage projection 75g of the first X-axis direction moving member 75 is in contact with a transfer roller 21c (see FIGS. 12, 13 and 24) mounted to the X-axis direction stage 21 so that a moving force in the X-axis direction is transferred from the first X-axis direction moving member 75 to the X-axis direction stage 21 via the contacting engagement between the linkage projection 75g and the transfer roller 21c. The transfer roller 21c is supported by a rotation pin parallel to the photographing optical axis Z1 so as to be freely rotatable on the rotation pin. When the X-axis direction stage 21 moves with the Y-axis direction moving stage 71 in the Y-axis direction, the transfer roller 21c rolls on a contacting surface of the linkage projection 75g. This contacting surface of the linkage projection 75g is a flat surface elongated in the Y-axis direction, and accordingly, allows the transfer roller 21c to roll on the contacting surface of the linkage projection 75g makes it possible for the X-axis direction stage 21 to move in the Y-axis direction without exerting any driving force in the Y-axis direction to the first X-axis direction moving member 75.

Figure 11:
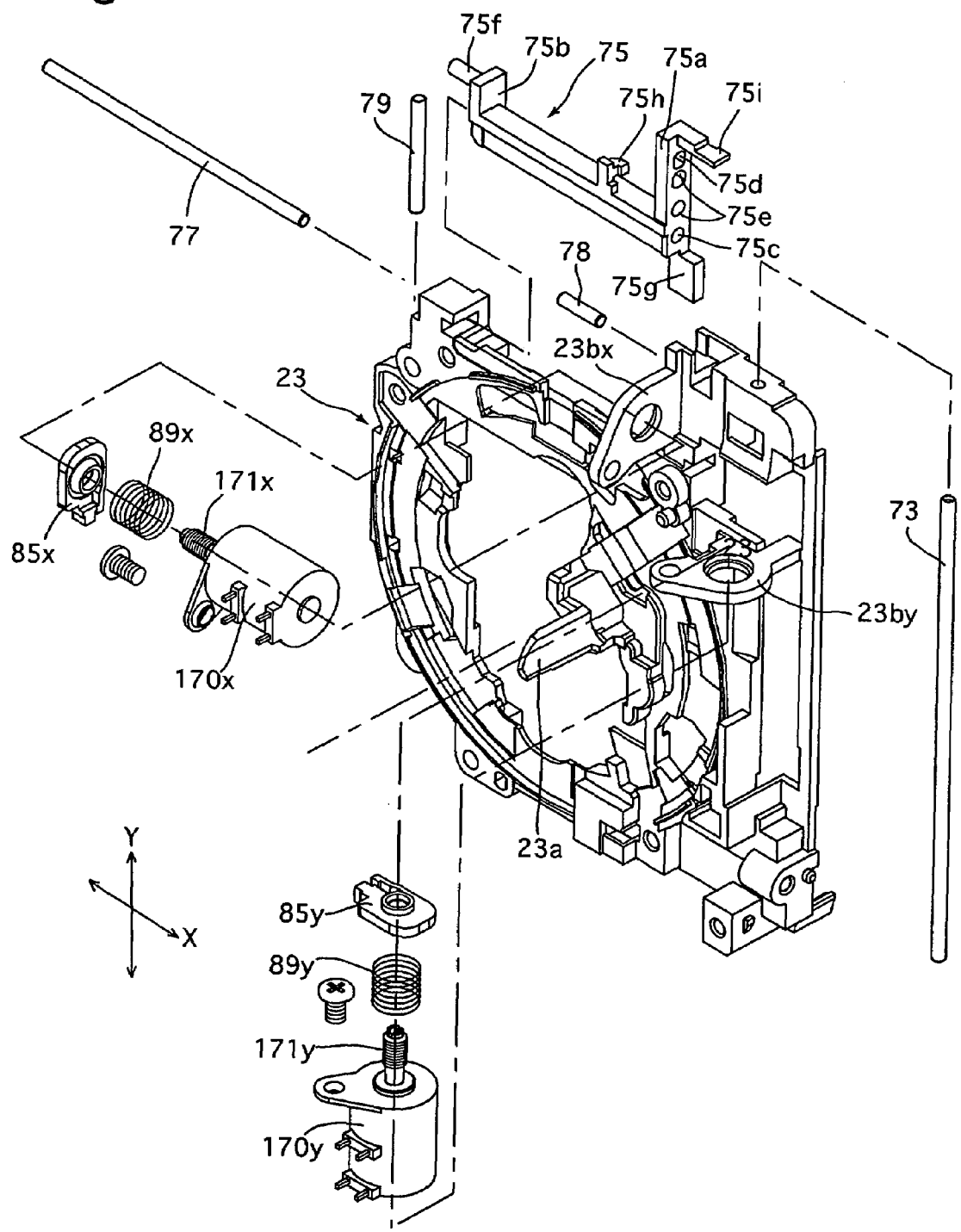
FIG. 11 is an exploded perspective view of a portion of the image stabilizing unit in the vicinity of a stationary holder thereof.
Figure 12:
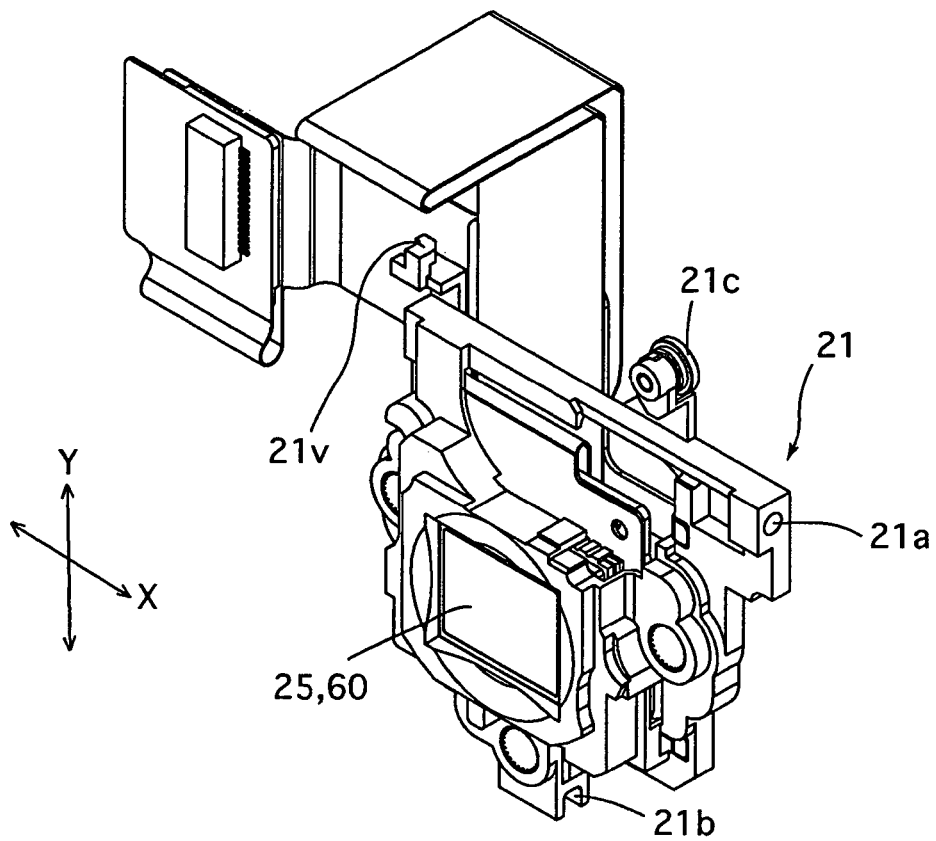
FIG. 12 is a front perspective view of an X-axis direction moving stage and associated elements shown in FIG. 10.
Figure 13:
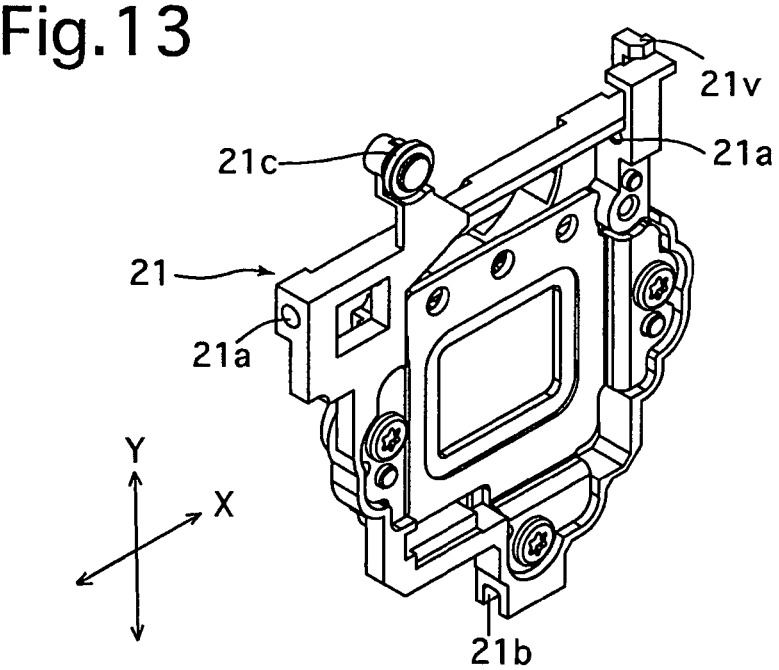
FIG. 13 is a rear perspective view of the X-axis direction moving stage shown in FIG. 12.

As shown in FIG. 11, the image stabilizing unit IS is provided with an X-axis drive motor 170x serving as a drive source for driving the CCD image sensor 60 in the X-axis direction and a Y-axis drive motor 170y serving as a drive source for driving the CCD image sensor 60 in the Y-axis direction. The X-axis drive motor 170x and the Y-axis drive motor 170y are fixed to a motor bracket 23bx and a motor bracket 23by, respectively, which are integrally formed on the stationary holder 23. Each of the X-axis drive motor 170x and the Y-axis drive motor 170y is a stepping motor. A drive shaft (rotary shaft) of the X-axis drive motor 170x is threaded to serve as a feed screw 171x, and a drive shaft (rotary shaft) of the Y-axis drive motor 170y is threaded to serve as a feed screw 171y. The feed screw 171x is screwed into a female screw hole of an X-axis direction driven nut member 85x and the feed screw 171y is screwed into a female screw hole of a Y-axis direction driven nut member 85y. The X-axis direction driven nut member 85x is guided linearly in the X-axis direction by the linear groove 76f, and is in contact with the nut contacting portion 76e. The Y-axis direction driven nut member 85y is guided linearly in the Y-axis direction by the linear groove 80f, and is in contact with the nut contacting portion 80e. The X-axis direction driven nut member 85x can be screw-disengaged from either end of the feed screw 171x, and the Y-axis direction driven nut member 85y can be screw-disengaged from either end of the feed screw 171y.

A nut-member biasing spring (biasing device) 89x is positioned between the X-axis direction driven nut member 85x and the X-axis drive motor 170x, and a nut-member biasing spring (biasing device) 89y is positioned between the Y-axis direction driven nut member 85x and the X-axis drive motor 170y. Each of the nut-member biasing springs 89x and 89y is a compression coil spring which is loosely fitted on the associated feed screw 171x and 171y, respectively, in a compressed state. The nut-member biasing spring 89x biases the X-axis direction driven nut member 85x in a direction to bring the X-axis direction driven nut member 85x back into screw engagement with the X-axis drive motor 170x in the case where the X-axis direction driven nut member 85x is disengaged from the X-axis drive motor 170x toward the X-axis drive motor 170x side. Likewise, the nut-member biasing spring 89y biases the Y-axis direction driven nut member 85y in a direction to bring the Y-axis direction driven nut member 85y back into screw engagement with the Y-axis drive motor 170y in the case where the Y-axis direction driven nut member 85y is disengaged from the Y-axis drive motor 170y toward the Y-axis drive motor 170y side.

Figure 24:
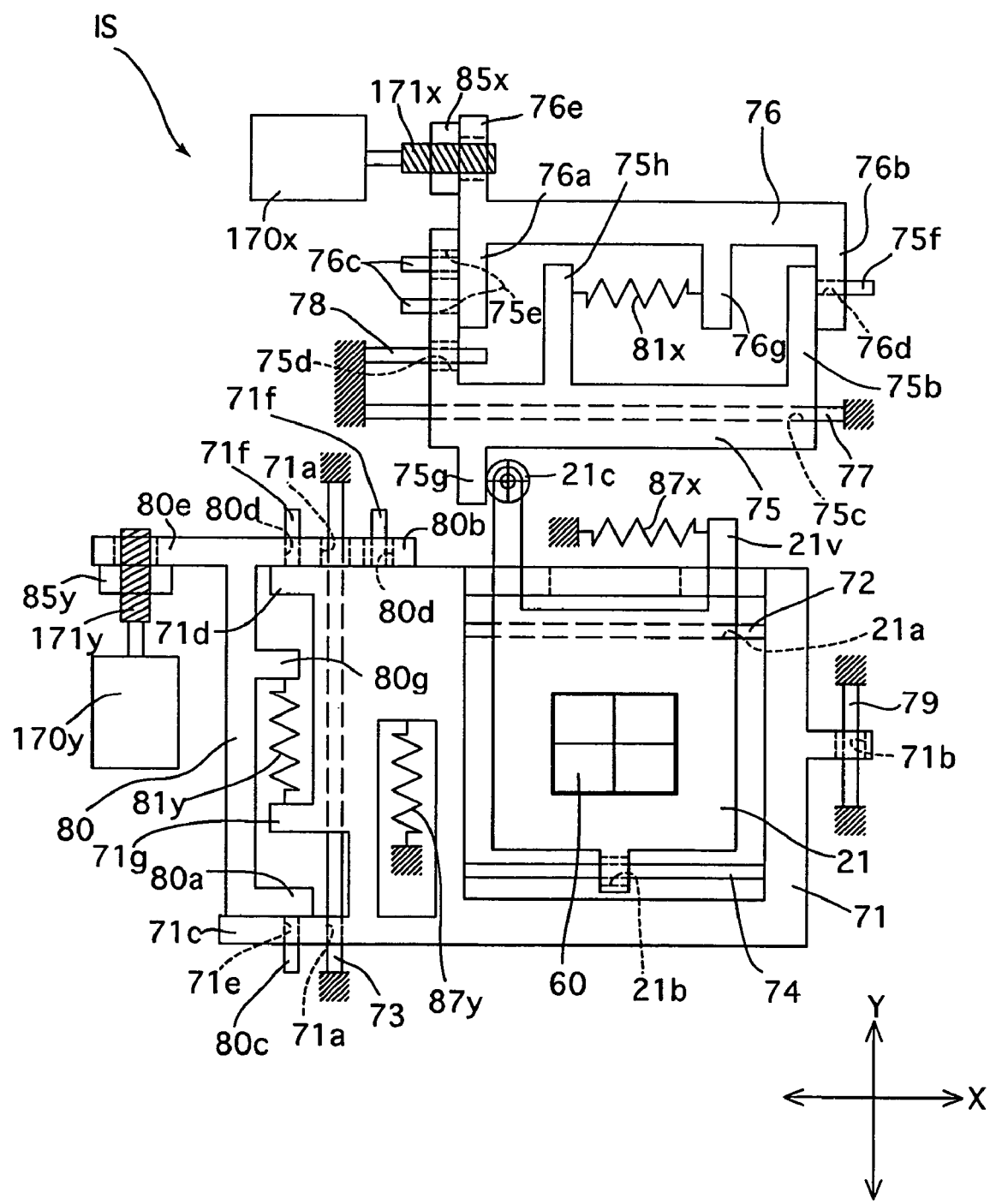
FIG. 24 is a diagrammatic illustration of the image stabilizing unit, showing the structure thereof.

FIG. 24 schematically shows the structure of the image stabilizing unit IS, viewed from the rear of the digital camera 200. Note that the relative position between the X-axis direction guide rod 78 and the pair of guide pins 76c, etc., are different from those shown in FIGS. 7 through 23 for the purpose of illustration. As can be understood from this schematic diagram, in the driving mechanism for driving the CCD image sensor 60 in the X-axis direction, the first X-axis direction moving member 75 and the second X-axis direction moving member 76 are coupled to each other resiliently by the biasing force of the extension joining spring 81x with the movement limit lug 75a and the movement limit lug 75b in contact with the movement limit lug 76a and the movement limit lug 76b, respectively. The biasing force of the X-axis direction stage biasing spring 87x is exerted on the first X-axis direction moving member 75 via the transfer roller 21c, which is in contact with the linkage projection 75g. Although the biasing force of the X-axis direction stage biasing spring 87x is exerted on the first X-axis direction moving member 75 leftward as viewed in FIG. 24, i.e., in a direction to disengage the movement limit lugs 75a and 75b from the movement limit lugs 76a and 76b, respectively, the biasing force (spring force) of the extension joining spring 81x is predetermined to be greater than that of the X-axis direction stage biasing spring 87x. Therefore, the first X-axis direction moving member 75 and the second X-axis direction moving member 76 are collectively biased leftward as viewed in FIG. 24 while maintaining the movement limit lugs 75a and 75b in resilient contact with the movement limit lugs 76a and 76b, respectively. Since the leftward movement of the second X-axis direction moving member 76 is limited by the engagement of the nut contacting portion 76e with the X-axis direction driven nut member 85x, the position of the X-axis direction driven nut member 85x serves as a reference position for each of the first X-axis direction moving member 75 and the second X-axis direction moving member 76 in the X-axis direction. As can be seen in FIG. 24, the end of the feed screw 171x extends through a through-hole (see FIGS. 14 and 15) formed on the nut contacting portion 76e so as not to interfere therewith.

Driving the X-axis drive motor 170x to rotate the drive shaft thereof (the feed screw 171x) causes the X-axis direction driven nut member 85x, that is screw-engaged with the feed screw 171x, to move linearly in the X-axis direction, thus causing the relative position between the first X-axis direction moving member 75 and the second X-axis direction moving member 76 in the X-axis direction to vary. For instance, if moved rightward with respect to the view shown in FIG. 24, the X-axis direction driven nut member 85x presses the nut contacting portion 76e in the same direction to thereby integrally move the first X-axis direction moving member 75 and the second X-axis direction moving member 76 rightward as viewed in FIG. 24 against the spring force of the X-axis direction stage biasing spring 87x. If the first X-axis direction moving member 75 is moved rightward with respect to the view shown in FIG. 24, the linkage projection 75g presses the transfer roller 21c in the same direction to thereby move the X-axis direction stage 21 rightward as viewed in FIG. 24. Conversely, if the X-axis direction driven nut member 85x is moved leftward as viewed in FIG. 24, the first X-axis direction moving member 75 and the second X-axis direction moving member 76 follow the X-axis direction driven nut member 85x to integrally move leftward as viewed in FIG. 24 by the biasing force of the X-axis direction stage biasing spring 87x. At this time, the X-axis direction stage 21 follows the first X-axis direction moving member 75 to move leftward as viewed in FIG. 24 by the biasing force of the X-axis direction stage biasing spring 87x. The linkage projection 75g and the transfer roller 21c are maintained in contact with each other at all times by the biasing force of the X-axis direction stage biasing spring 87x.

In the driving mechanism for driving the CCD image sensor 60 in the Y-axis direction, the Y-axis direction moving stage 71 and the Y-axis direction moving member 80 are resiliently coupled to each other via the extension joining spring 81y with the movement limit lugs 71c and 71d being in contact with the movement limit lugs 80a and 80b, respectively. Although the Y-axis direction moving stage 71 is biased downward as viewed in FIG. 24 by the spring force of the Y-axis direction stage biasing spring 87y, i.e., in a direction to disengage the movement limit lugs 71c and 71d from the movement limit lugs 80a and 80b, respectively, the biasing force (spring force) of the extension joining spring 81y is predetermined to be greater than that of the Y-axis direction stage biasing spring 87y. Therefore, the Y-axis direction moving stage 71 and the Y-axis direction moving member 80 are collectively biased downward while maintaining the movement limit lugs 71c and 71d in resilient contact with the movement limit lugs 80a and 80b, respectively. Since the downward movement of the Y-axis direction moving member 80 is limited by the engagement of the nut contacting portion 80e with the Y-axis direction driven nut member 85y, the position of the Y-axis direction driven nut member 85y serves as a reference position for each of the Y-axis direction moving stage 71 and the Y-axis direction moving member 80 in the Y-axis direction. As can be seen in FIG. 24, the end of the feed screw 171y extends through a through-hole (see FIGS. 16 and 17) formed on the nut contacting portion 80e so as not to interfere therewith.

Driving the Y-axis drive motor 170y to rotate the drive shaft thereof (the feed screw 171y) causes the Y-axis direction driven nut member 85y, that is screw-engaged with the feed screw 171y, to move linearly in the Y-axis direction, thus causing the relative position between the Y-axis direction moving stage 71 and the Y-axis direction moving member 80 in the Y-axis direction to vary. For instance, if the Y-axis direction driven nut member 85y is moved upward as viewed in FIG. 24, the Y-axis direction driven nut member 85y presses the nut contacting portion 80e in the same direction to thereby integrally move the Y-axis direction moving stage 71 and the Y-axis direction moving member 80 upward with respect to the view shown in FIG. 24 against the spring force of the Y-axis direction stage biasing spring 87y. Conversely, if the Y-axis direction driven nut member 85y is moved downward with respect to the view shown in FIG. 24, the Y-axis direction moving stage 71 and the Y-axis direction moving member 80 follow the Y-axis direction driven nut member 85y to integrally move downward by the biasing force of the Y-axis direction stage biasing spring 87y.

When the Y-axis direction moving stage 71 moves in the Y-axis direction, the X-axis direction stage 21 that is supported by the Y-axis direction moving stage 71 thereon moves together with the Y-axis direction moving stage 71. On the other hand, when the X-axis direction stage 21 moves together with the Y-axis direction moving stage 71 vertically in the Y-axis direction, the contacting point between the transfer roller 21c and the contacting surface of the linkage projection 75g varies because the first X-axis direction moving member 75, with which the transfer roller 21c is in contact, does not move in the Y-axis direction. At this time, the transfer roller 21c rolls on the contacting surface of the linkage projection 75g, so that the X-axis direction stage 21 can be moved in the Y-axis direction without exerting any driving force in the Y-axis direction to the first X-axis direction moving member 75.

According to the above described structure of the image stabilizing unit IS, the X-axis direction stage 21 can be moved forward and reverse in the X-axis direction by driving the X-axis drive motor 170x forward and reverse, respectively; and the Y-axis direction moving stage 71, together with the X-axis direction stage 21 that is supported by the Y-axis direction moving stage 71, can be moved forward and reverse in the Y-axis direction by driving the Y-axis drive motor 170y forward and reverse, respectively.

Figure 18:
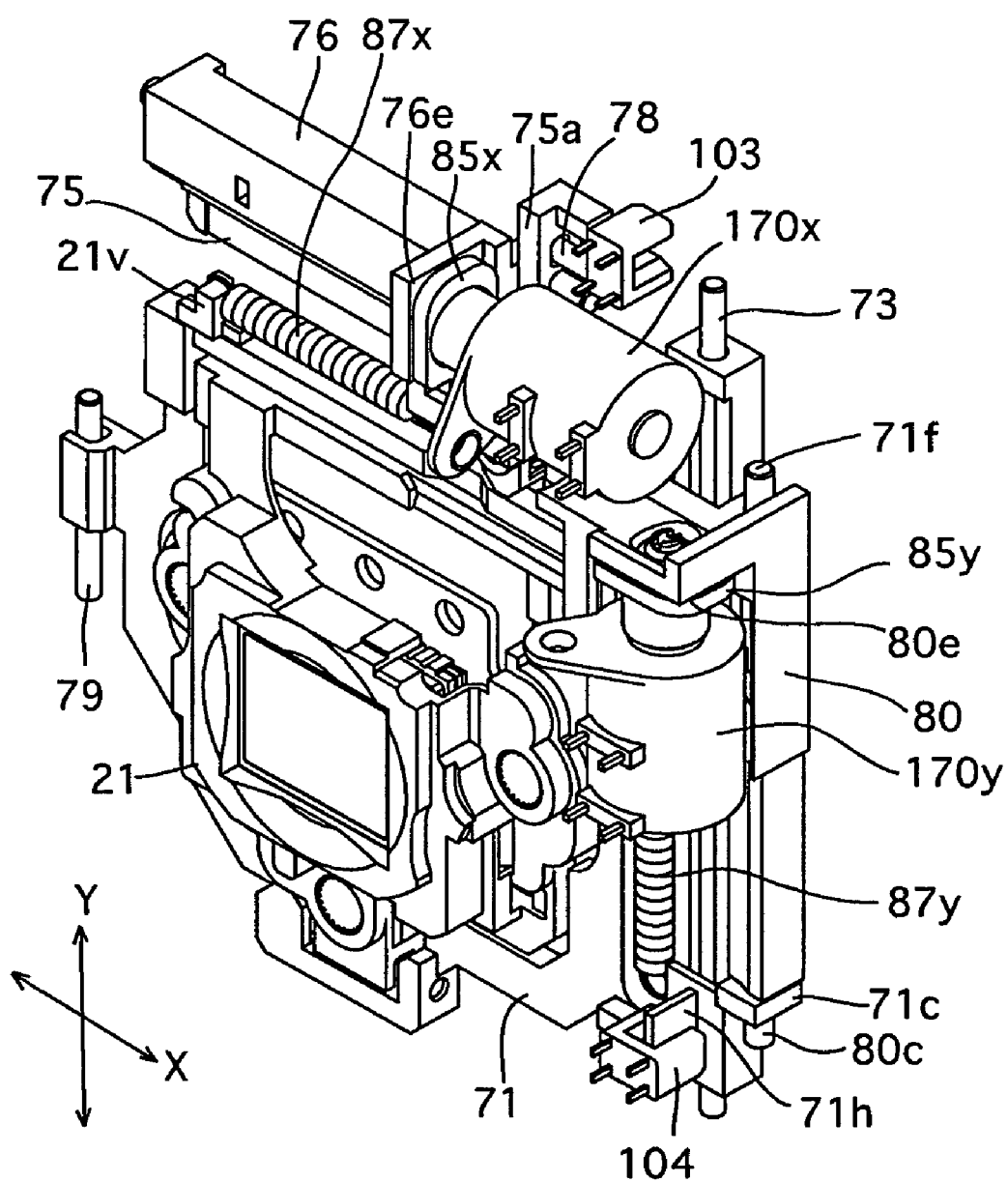
FIG. 18 is a front perspective view of the image stabilizing unit from which the stationary holder is removed.
Figure 19:
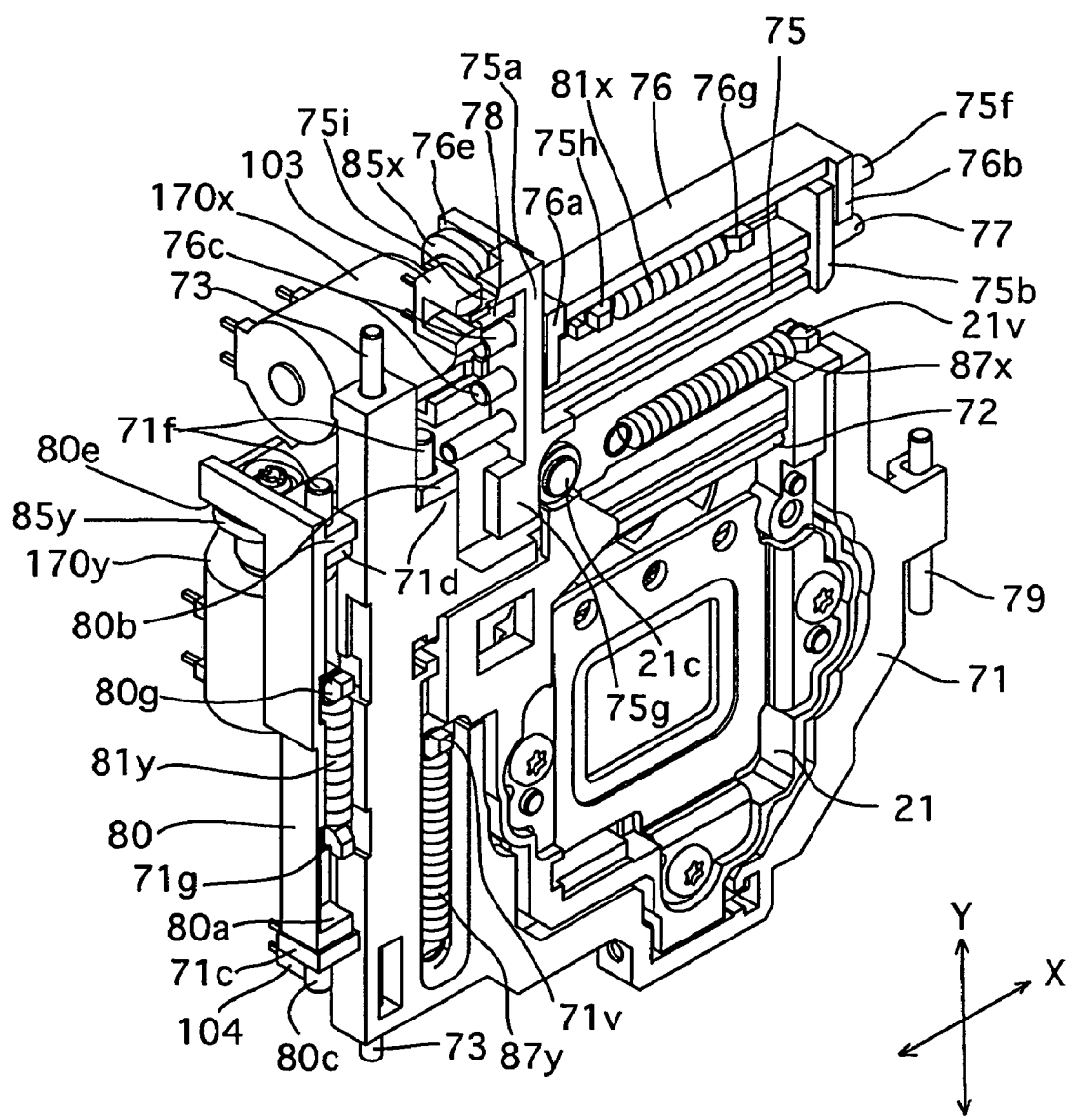
FIG. 19 is a rear perspective view of the elements of the image stabilizing unit shown in FIG. 18.
Figure 20:
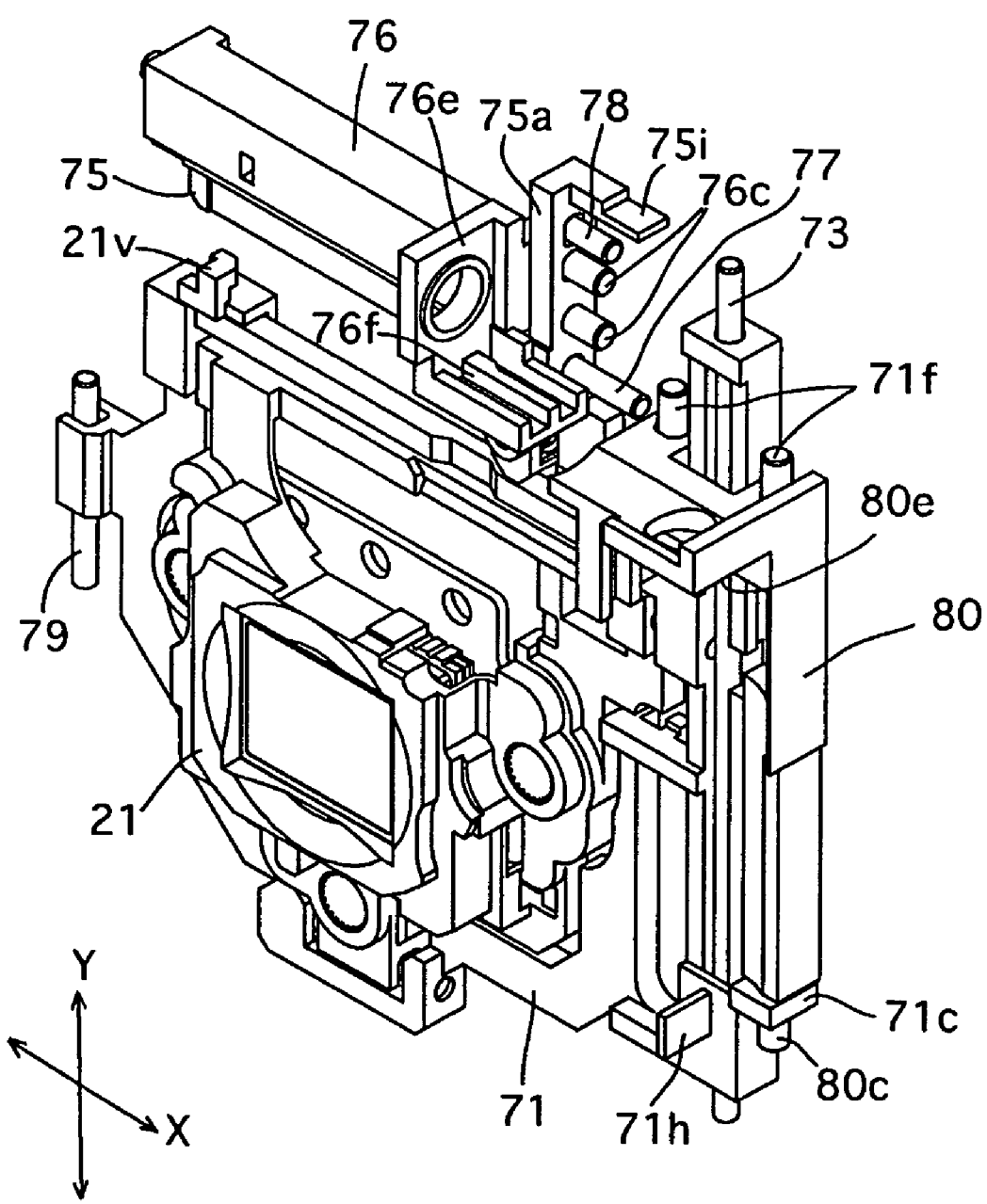
FIG. 20 is a front perspective view of the elements of the image stabilizing unit shown in FIGS. 18 and 19 from which drive motors, photo-interrupters and biasing springs are further removed.
Figure 21:
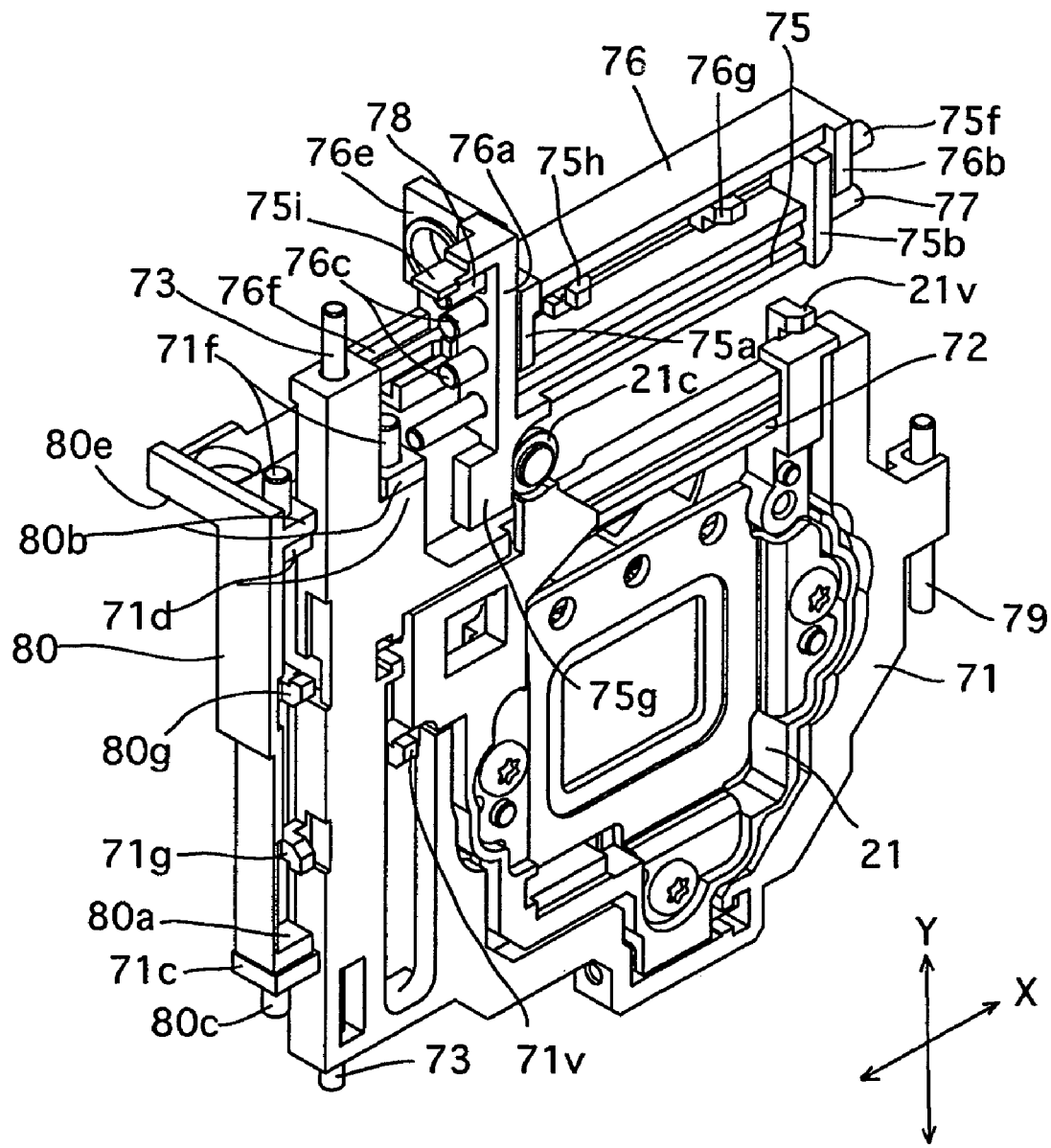
FIG. 21 is a rear perspective view of the elements of the image stabilizing unit shown in FIG. 20.
Figure 22:
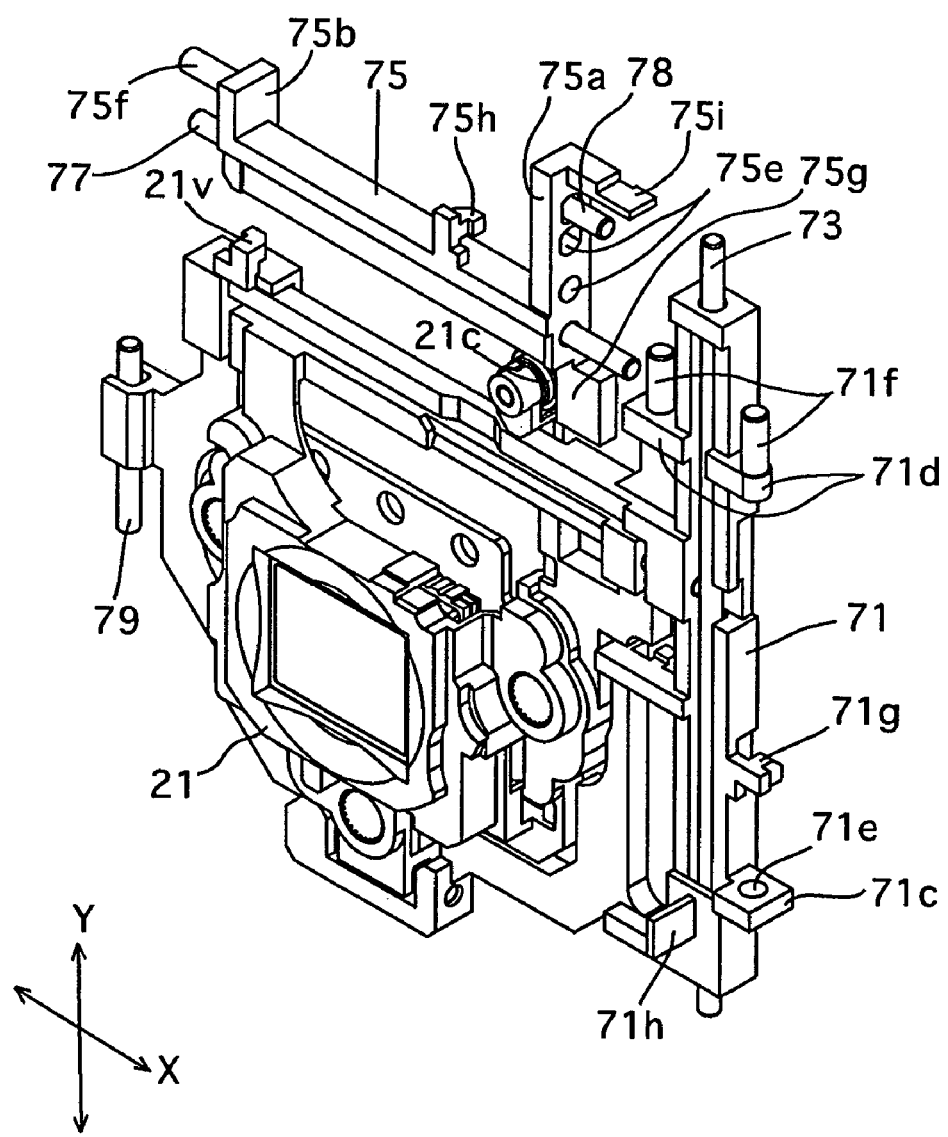
FIG. 22 is a front perspective view of the elements of the image stabilizing unit shown in FIGS. 20 and 21 from which the second X-axis direction moving member and the Y-axis direction moving member are further removed.
Figure 23:
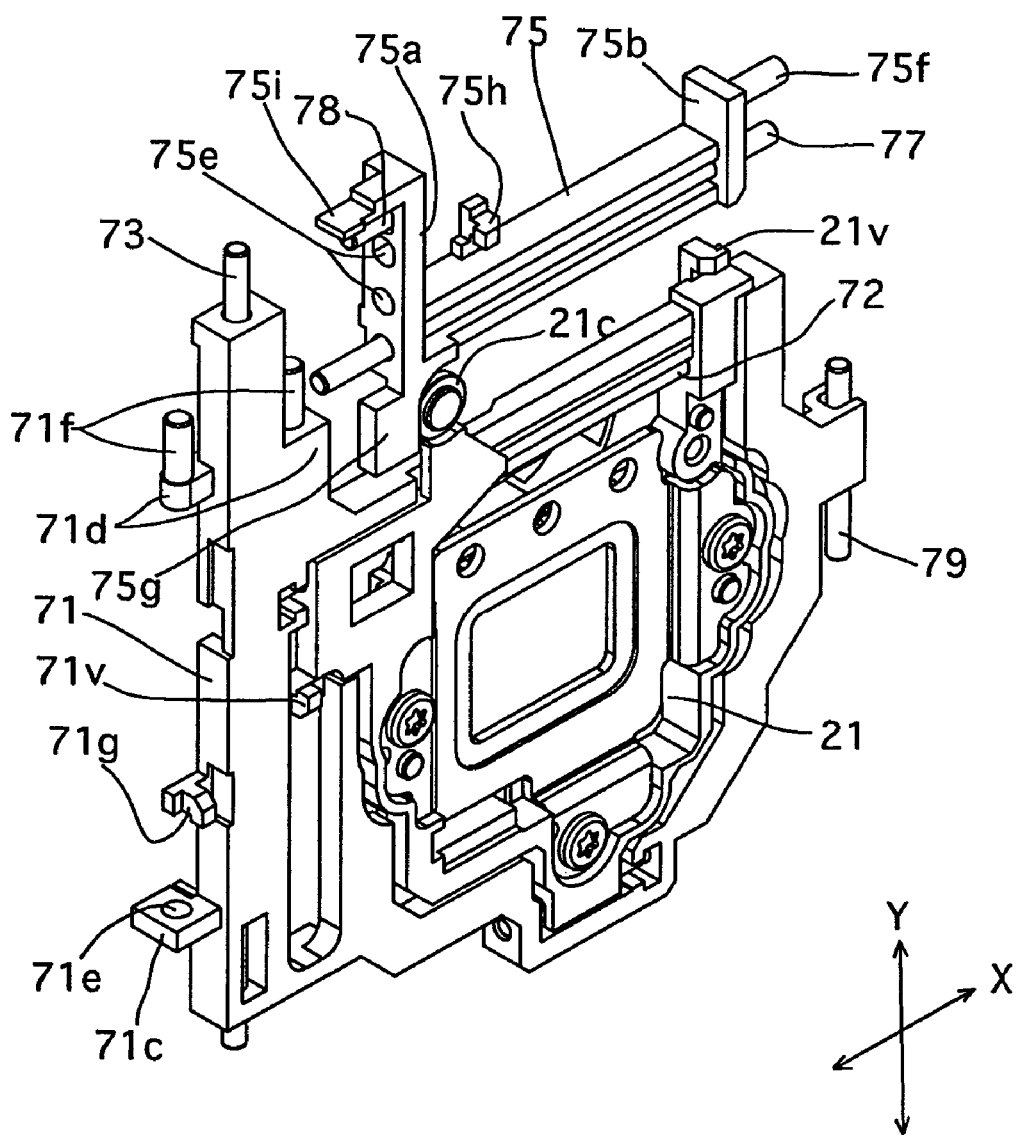
FIG. 23 is a rear perspective view of the elements of the image stabilizing unit shown in FIG. 22.

As shown in FIGS. 14 and 15, the first X-axis direction moving member 75 is provided in the vicinity of the movement limit lug 75a with a position detection lug 75i in the shape of a small thin plate. As shown in FIG. 16, the Y-axis direction moving stage 71 is provided in the vicinity of the movement limit lug 71c with a position detection lug 71h in the shape of a small thin plate. As shown in FIGS. 18 and 19, the image stabilizing unit IS is provided with a first photo-interrupter 103 and a second photo-interrupter 104. The first photo-interrupter 103 detects the presence of the position detection lug 75i of the first X-axis direction moving member 75 that passes between mutually facing emitter/receiver elements when the light beam is blocked by the position detection lug 75i. Likewise, the second photo-interrupter 104 detects the presence of the position detection lug 71h of the Y-axis direction moving stage 71 that passes between mutually facing emitter/receiver elements when the light beam is blocked by the position detection lug 71h. The initial position of the first X-axis direction moving member 75 (the X-axis direction stage 21) in the X-axis direction can be detected by detecting the presence of the position detection lug 75i by the first photo-interrupter 103, while the initial position of the Y-axis direction moving stage 71 in the Y-axis direction can be detected by detecting the presence of the position detection lug 71h by the second photo-interrupter 104.

As shown in the block diagram in FIG. 25, the digital camera 200 is provided with an X-axis direction gyro sensor (angular velocity sensor) 105 and a Y-axis direction gyro sensor (angular velocity sensor) 106 which detect the angular velocity (angular speed) about two axes (the X-axis and the Y-axis) orthogonal to each other. The magnitude and the direction of camera shake (vibrations) applied to the digital camera 200 are detected by these two gyro sensors 105 and 106. Subsequently, the control circuit 102 determines a moving angle by time-integrating the angular velocity of the camera shake in the two axial directions, detected by the two gyro sensors 105 and 106. Subsequently, the control circuit 102 calculates from the moving angle the moving amounts of the image on a focal plane (imaging surface of the CCD image sensor 60) in the X-axis direction and in the Y-axis direction. The control circuit 102 further calculates the driving amounts and the driving directions of the X-axis direction stage 21 (the first X-axis direction moving member 75 and the second X-axis direction moving member 76) and the Y-axis direction moving stage 71 (the Y-axis direction moving member 80) for the respective axial directions (driving pulses for the X-axis drive motor 170x and the Y-axis drive motor 170y) in order to counteract camera shake. Thereupon, the X-axis drive motor 170x and the Y-axis drive motor 170y are actuated and the operations thereof are controlled in accordance with the calculated values, which counteract image shake of an object image captured by the CCD image sensor 60. The digital camera 200 can be put into this image stabilization mode by turning on a photographing mode select switch 107 (see FIG. 25). If the photographing mode select switch 107 is in an off-state, the image stabilizing capability is deactivated so that a normal photographing operation is performed.

Additionally, by operating the photographing mode select switch 107, either a first tracking mode or a second tracking mode can be selected in the image stabilization mode. The image stabilizing capability remains activated by driving the X-axis drive motor 170x and the Y-axis drive motor 170y in the first tracking mode, while the image stabilizing capability is activated by driving the X-axis drive motor 170x and the Y-axis drive motor 170y only when a photometric switch 108 or a release switch 109 (see FIG. 25) provided in the digital camera 200 is turned ON in the second tracking mode. The photometric switch 108 is turned ON by depressing the shutter button 205 half way, and the release switch 109 is turned ON by fully depressing the shutter button 205.

The above illustrated image stabilizer of the digital camera 200 is provided with a damage-protection structure which absorbs loads and impacts on a driving force transfer mechanism from each of the X-axis drive motor 170x and the Y-axis drive motor 170y to the CCD image sensor 60 (the X-axis direction stage 21) to prevent damage to the feed screws 171x and 171y and other associated elements. This damage-protection structure is composed of two major components: a first component composed of the first X-axis direction moving member 75 and the second X-axis direction moving member 76 (which are resiliently coupled to each other by the extension joining spring 81x) in the driving mechanism for driving the CCD image sensor 60 in the X-axis direction and a second part composed of the Y-axis direction stage 71 and the Y-axis direction moving member 80 (which are resiliently coupled to each other by the extension joining spring 81y) in the driving mechanism for driving the CCD image sensor 60 in the Y-axis direction.

The driving mechanism for driving the CCD image sensor 60 in the X-axis direction has the capability of protecting itself from damage. This capability will be discussed hereinafter.

For instance, when the X-axis direction driven nut member 85x is moved rightward with respect to the view shown in FIG. 24 by the X-axis drive motor 170x, the first X-axis direction moving member 75 and the second X-axis direction moving member 76, which move integrally in a normal state, move relative to each other in the X-axis direction so as to disengage the movement limit lug 75a and the movement limit lug 76a (and also the movement limit lug 75b and the movement limit lug 76b) from each other against the biasing force of the extension joining spring 81x in the event of the X-axis direction stage 21 abutting against the Y-axis direction stage 71 upon reaching a mechanical limit of movement of the X-axis direction stage 21 or other causes which interfere with movement of the X-axis direction stage 21. Specifically, the second X-axis direction moving member 76 can solely move rightward in the X-axis direction relative to the first X-axis direction moving member 75 in the case where movement of the first X-axis direction moving member 75, together with the X-axis direction stage 21, is prevented for some reason. This structure makes it possible for the X-axis direction driven nut member 85x to move along the feed screw 171x even if the X-axis direction stage 21 becomes immobilized. This prevents excessive loads on the aforementioned driving force transfer mechanism, thus preventing thread jamming between the feed screw 171x and the X-axis direction driven nut member 85x and further preventing damage to other associated parts of the driving force transfer mechanism. When the X-axis direction driven nut member 85x is moved leftward with respect to the view shown in FIG. 24 by the X-axis drive motor 170x, the X-axis direction driven nut member 85x moves in a direction away from the nut contacting portion 76e, and accordingly, the driving force of the X-axis drive motor 170x does not act on either the first X-axis direction moving member 75 or the second X-axis direction moving member 76; hence, no undue loads are exerted on the driving force transfer mechanism even if movement of the X-axis direction stage 21 is prevented for some reason.

Similar to the driving mechanism for driving the CCD image sensor 60 in the X-axis direction, the driving mechanism for driving the CCD image sensor 60 in the Y-axis direction also has the capability of protecting itself from damage. This capability will be discussed hereinafter.

For instance, when the Y-axis direction driven nut member 85y is moved upward with respect to the view shown in FIG. 24 by the Y-axis drive motor 170y, the Y-axis direction moving member 80 and the Y-axis direction moving stage 71, which move integrally in a normal state, move relative to each other in the Y-axis direction to disengage the movement limit lug 71c and the movement limit lug 80a (and also the movement limit lug 71d and the movement limit lug 80b) away from each other against the biasing force of the extension joining spring 81y in the event of the Y-axis direction stage 71 abutting against the stationary holder 23 upon reaching a mechanical limit of movement of the Y-axis direction stage 71 or other causes which interfere with movement of the Y-axis direction stage 71 (or the X-axis direction stage 21). Specifically, the Y-axis direction moving member 80 can solely move upward in the Y-axis direction relative to the Y-axis direction moving stage 71 in the case where movement of the Y-axis direction stage 71 is prevented for some reason. This structure makes it possible for the Y-axis direction driven nut member 85y to move along the feed screw 171y even if the Y-axis direction stage 71 becomes immobilized. This prevents excessive loads on the aforementioned driving force transfer mechanism, thus preventing thread jamming between the feed screw 171y and the Y-axis direction driven nut member 85y and further preventing damage to other associated parts of the driving force transfer mechanism. When the Y-axis direction driven nut member 85y is moved downward with respect to the view shown in FIG. 24 by the Y-axis drive motor 170y, the Y-axis direction driven nut member 85y moves in a direction away from the nut contacting portion 80e, and accordingly, the driving force of the Y-axis drive motor 170y does not act on either the Y-axis direction moving member 80 or the Y-axis direction moving stage 71; hence, no undue loads are exerted on the driving force transfer mechanism even if movement of the Y-axis direction stage 71 is prevented for some reason.

As mentioned above, the range of movement of the X-axis direction stage 21 is defined by inner peripheral surfaces of the Y-axis direction moving stage 71, while the range of movement of the Y-axis direction moving stage 71 is defined by inner peripheral surfaces of the stationary holder 23. Namely, the mechanical limits of movement of the X-axis direction stage 21 in the X-axis direction are defined by inner peripheral surfaces of the Y-axis direction moving stage 71, while the mechanical limits of movement of the Y-axis direction stage 71 in the Y-axis direction are defined by inner peripheral surfaces of the stationary holder 23. It is desirable that the driving force of the X-axis drive motor 170x be stopped being transferred from the feed screw 171x to the X-axis direction driven nut member 85x upon the X-axis direction stage 21 reaching either of the right and left limits of movement thereof, and that the driving force of the Y-axis drive motor 170y be stopped being transferred from the feed screw 171y to the Y-axis direction driven nut member 85y upon the Y-axis direction stage 71 reaching either of the upper and lower limits of movement thereof. However, taking manufacturing tolerances of the associated components into consideration, such an ideal correlation cannot be always achieved. For instance, if the X-axis direction driven nut member 85x and the feed screw 171x (or the Y-axis direction driven nut member 85y and the feed screw 171y) are still screw-engaged with each other by a sufficient axial length in a state where the X-axis direction stage 21 (or the Y-axis direction stage 71) has reached a mechanical limit of movement thereof, there will be a possibility of jamming occurring between the feed screw 171x and the X-axis direction driven nut member 85x (or the feed screw 171y and the Y-axis direction driven nut member 85y) due to loads placed on each of the X-axis direction driven nut member 85x and the feed screw 171x (or the Y-axis direction driven nut member 85y and the feed screw 171y) by a further rotation of the X-axis drive motor 170x (or the Y-axis drive motor 170y) if the image stabilizer of the digital camera 200 incorporates no damage-protection structure such as the above described damage-protection structure.

To prevent this problem from occurring, the image stabilizing mechanism can be considered to be constructed so that the X-axis direction driven nut member 85x (the Y-axis direction driven nut member 85y) is disengaged from the feed screw 171x (171y) to come off upon reaching either end of the feed screw 171x (171y) after giving the X-axis direction driven nut member 85x (the Y-axis direction driven nut member 85y) a sufficient range of movement on the feed screw 171x (171y) so that the X-axis direction stage 21 (the Y-axis direction stage 71) may not reach a mechanical limit of movement thereof easily. However, according to this structure, the range of movement of each of the X-axis direction stage 21 and the Y-axis direction stage 71 is required to be increased more than necessary, which may undesirably increase the size of the whole image stabilizer. Additionally, if the X-axis direction stage 21 or the Y-axis direction stage 71 is jammed accidentally at some middle point in the range of movement thereof (i.e., not at either end of the range of movement thereof), heavy loads are put on the screw-engaged portion between the X-axis direction driven nut member 85x (or the Y-axis direction driven nut member 85y) and the feed screw 171x (or 171y), regardless of the range of movement of the X-axis direction stage 21 or the Y-axis direction stage 71.

Conversely, according to the above illustrated embodiment of the image stabilizer, a difference in amount of movement in the X-axis direction between the X-axis direction driven nut member 85x and the X-axis direction stage 21 is absorbed by intermediate members (i.e., the first X-axis direction moving member 75 and the second X-axis direction moving member 76), while a difference in amount of movement in the Y-axis direction between the Y-axis direction driven nut member 85y and the X-axis direction stage 21 is absorbed by intermediate members (i.e., the Y-axis direction stage 71 and the Y-axis direction moving member 80), and therefore, the range of movement of each of the X-axis direction stage 21 and the Y-axis direction stage 71 does not need to be increased more than necessary. Moreover, even if the X-axis direction stage 21 or the Y-axis direction stage 71 is jammed accidentally at some middle point in the range of movement thereof (i.e., not at either end of the range of movement thereof), no heavy loads are put on the screw-engaged portion between the X-axis direction driven nut member 85x (or the Y-axis direction driven nut member 85y) and the feed screw 171x (or 171y) because a difference in amount of movement in the X-axis direction between the X-axis direction driven nut member 85x and the X-axis direction stage 21 (or a difference in amount of movement in the Y-axis direction between the X-axis direction driven nut member 85y and the Y-axis direction stage 21) is absorbed by the aforementioned intermediate members (the first X-axis direction moving member 75 and the second X-axis direction moving member 76, or the Y-axis direction stage 71 and the Y-axis direction moving member 80).

In the present embodiment of the image stabilizer, the maximum amount of relative movement between the first X-axis direction moving member 75 and the second X-axis direction moving member 76 is predetermined to be capable of absorbing any difference in amount of movement between the X-axis direction driven nut member 85x and the X-axis direction stage 21 wherever each of the X-axis direction driven nut member 85x and the X-axis direction stage 21 may be positioned in the range of movement thereof. Likewise, the maximum amount of relative movement between the Y-axis direction stage 71 and the Y-axis direction moving member 80 is predetermined to be capable of absorbing any difference in amount of movement between the Y-axis direction driven nut member 85y and the Y-axis direction stage 71 wherever each of the Y-axis direction driven nut member 85y and the Y-axis direction stage 71 may be positioned in the range of movement thereof.

A restriction on movement on the X-axis direction stage 21 or the Y-axis direction stage 71 is not the only cause of imposing loads on the driving force transfer mechanism. Since the CCD image sensor 60, that serves as an optical element for counteracting image shake, is supported to be freely movable in the X-axis direction and the Y-axis direction, there is a possibility of the X-axis direction stage 21 (which holds the CCD image sensor 60) or the Y-axis direction stage 71 (which holds the X-axis direction stage 21) being subjected to a force which forces the X-axis direction stage 21 or the Y-axis direction stage 71 to move even though no driving force is applied thereto by the X-axis drive motor 170x or the Y-axis drive motor 170y, respectively, in the case where a shock or sudden impact is applied to the digital camera 200 when the digital camera 200 is, e.g., dropped to the ground. Even in such a case, such loads, shock or sudden impact can be securely absorbed in the present embodiment of the image stabilizer.

For instance, if the X-axis direction stage 21 is moved leftward with respect to the view shown in FIG. 24 by an external force other than the driving force of the X-axis drive motor 170x, the first X-axis direction moving member 75 is pressed in the same direction via the transfer roller 21c. Since this direction of pressing the first X-axis direction moving member 75 is a direction which disengages the movement limit lugs 75a and 75b from the movement limit lugs 76a and 76b, respectively, the first X-axis direction moving member 75 can solely move leftward relative to the second X-axis direction moving member 76 against the biasing force of the extension joining spring 81x. At this time, the first X-axis direction moving member 75 does not mechanically press the second X-axis direction moving member 76, so that only a resilient tensile force of the extension joining spring 81x acts on the second X-axis direction moving member 76, and accordingly, no excessive force is applied to the X-axis direction driven nut member 85x from the second X-axis direction moving member 76. If the X-axis direction stage 21 is moved rightward with respect to the view shown in FIG. 24 by an external force other than the driving force of the X-axis drive motor 170x, the X-axis direction stage 21 moves in a direction to disengage the transfer roller 21c from the linkage projection 75g, either the first X-axis direction moving member 75 or the second X-axis direction moving member 76 is subjected to the moving force of the X-axis direction stage 21. Namely, even if the X-axis direction stage 21 is forced to move forward or reverse in the X-axis direction by an external force or the like when the X-axis drive motor 170x is not in operation, no undue loads are exerted on the screw-engaged portion between the X-axis direction driven nut member 85x and the feed screw 171x.

On the other hand, if the Y-axis direction stage 71 is moved downward with respect to the view shown in FIG. 24 by an external force other than the driving force of the Y-axis drive motor 170y, this moving direction of the Y-axis direction stage 71 is a direction which disengages the movement limit lugs 80a and 80b from the movement limit lugs 71c and 71d, respectively, and accordingly, the Y-axis direction stage 71 can solely move downward relative to the Y-axis direction moving member 80 against the biasing force of the extension joining spring 81y. At this time, the Y-axis direction stage 71 does not mechanically press the Y-axis direction moving member 80, so that only a resilient tensile force of the extension joining spring 81y acts on the Y-axis direction moving member 80, and accordingly, no excessive force is applied to the Y-axis direction driven nut member 85y from the Y-axis direction moving member 80. If the X-axis direction stage 21 is moved upward with respect to the view shown in FIG. 24 by an external force other than the driving force of the X-axis drive motor 170x, the Y-axis direction moving member 80 is pressed upward via the engagement between the movement limit lug 80a and the movement limit lug 71c and the engagement between the movement limit lug 80b and the movement limit lug 71d. At this time, the moving force of the Y-axis direction moving member 80 does not act on the Y-axis direction driven nut member 85y because this direction of movement of the Y-axis direction moving member 80 is a direction to disengage the nut contacting portion 80e from the Y-axis direction driven nut member 85y. Namely, even if the Y-axis direction stage 71 is forced to move forward or reverse in the Y-axis direction by an external force or the like when the Y-axis drive motor 170y is not in operation, no undue loads are exerted on the screw-engaged portion between the X-axis direction driven nut member 85y and the feed screw 171y.

As can be understood from the above description, according to the above illustrated embodiment of the image stabilizer, in either of the following two cases, i.e., the case where a malfunction occurs in the moving operation of the X-axis direction stage 21 and/or the Y-axis direction stage 71 when it is driven by the X-axis drive motor 170x or the Y-axis drive motor 170y; and the case where the X-axis direction stage 21 and/or the Y-axis direction stage 71 is forced to move unexpectedly by an external force or the like, such an accidental movement can be absorbed to thereby prevent the driving mechanism for the image-stabilizing optical element from being damaged. Specifically, the image stabilizer is designed so that no heavy loads are put on either of the two screw-engaged portions between the X-axis direction driven nut member 85x and the feed screw 171x and between the Y-axis direction driven nut member 85y and the feed screw 171y, which produces a high degree of effectiveness of preventing each of these two screw-engaged portions from being damaged. Although it is possible to drive the X-axis direction stage 21 and the Y-axis direction stage 71 with a high degree of precision by narrowing the lead angles of the feed screws 171x and 171y, respectively, a narrowing of the lead angle of either feed screw disadvantageously reduces the strength of the feed screw mechanism. However, according to the above illustrated embodiment of the image stabilizer, the lead angle of each feed screw can be narrowed since no heavy loads are applied on either of the aforementioned two screw-engaged portions.

Figure 26:
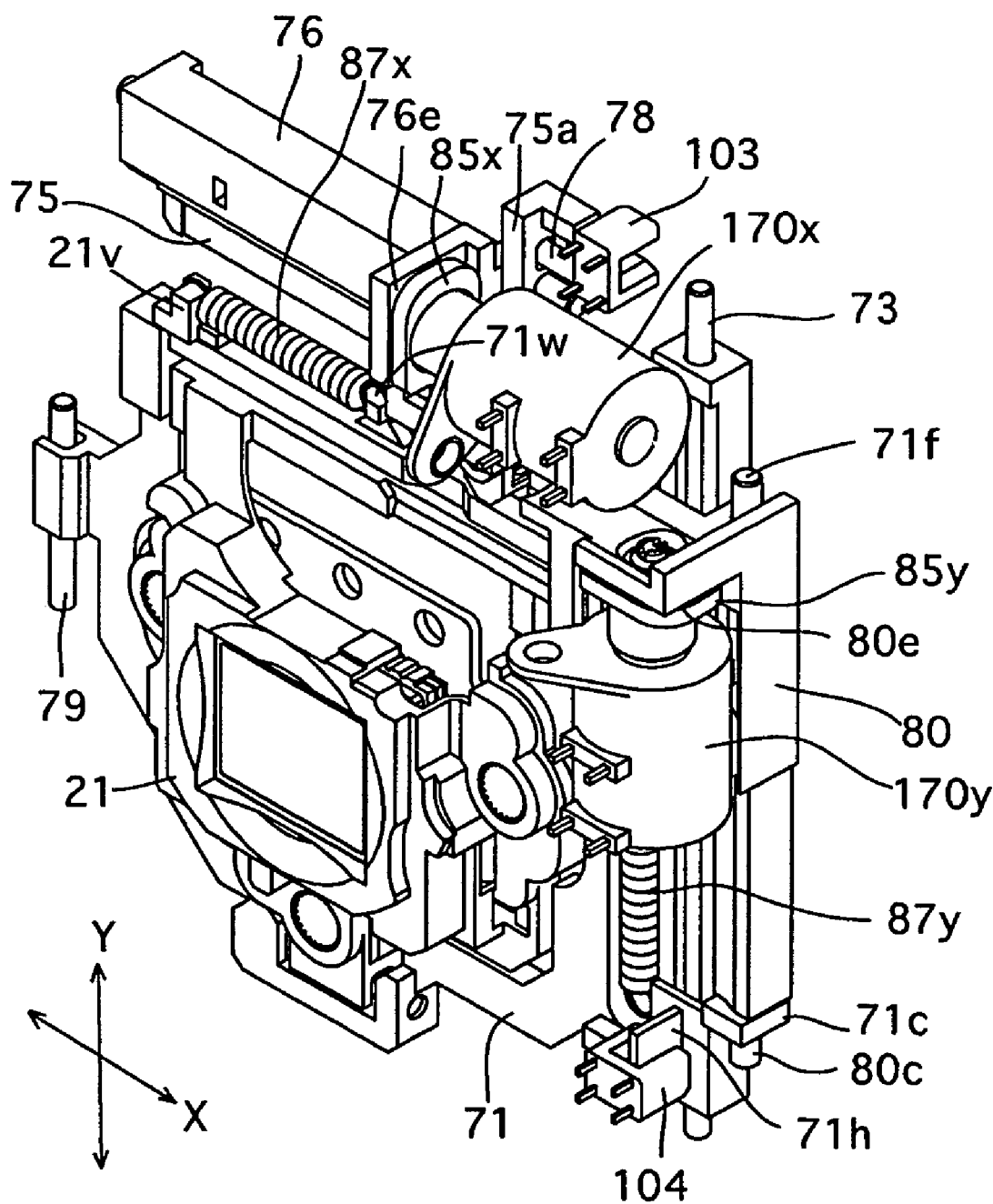
FIG. 26 is a view similar to that of FIG. 18, showing another embodiment (second embodiment) of the image stabilizing unit from which the stationary holder is removed.
Figure 27:
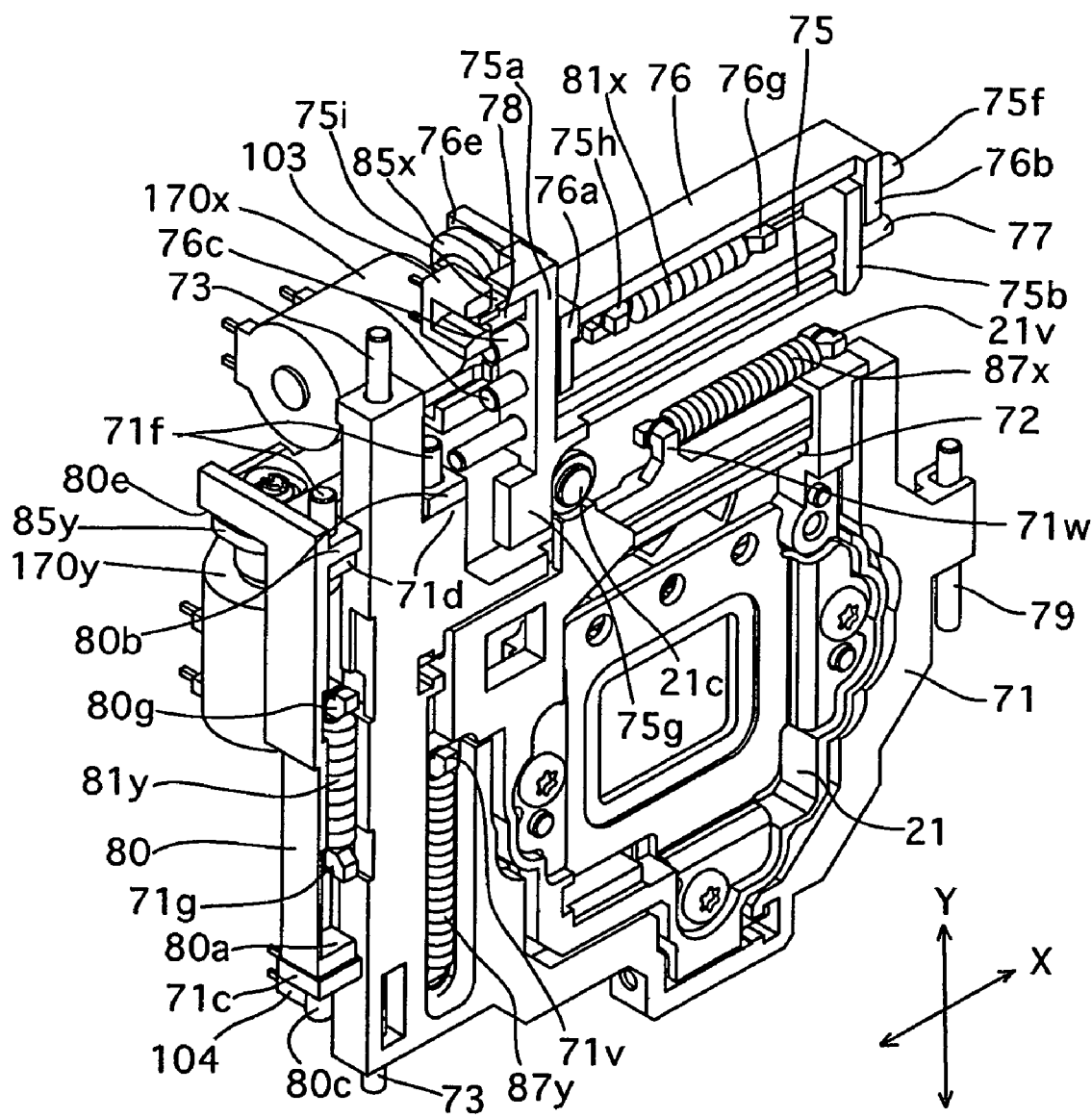
FIG. 27 is a rear perspective view of the elements of the image stabilizing unit shown in FIG. 26.
Figure 28:
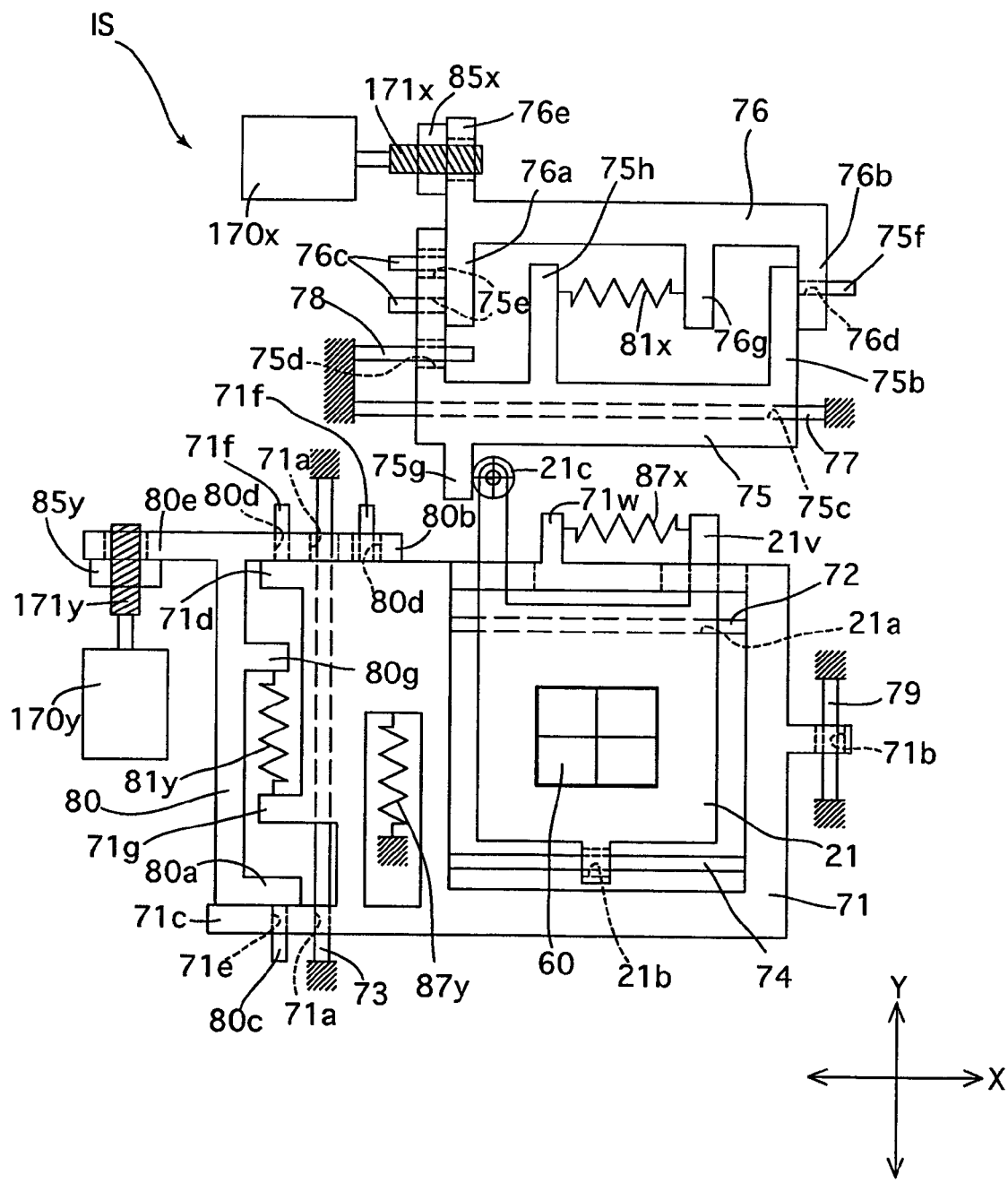
FIG. 28 is a diagrammatic illustration of the second embodiment of the image stabilizing unit, showing the structure thereof.

FIGS. 26 through 28 show another embodiment (second embodiment) of the image stabilizing unit IS. In this embodiment, the elements corresponding to those in the previous embodiment (first embodiment) of the image stabilizer IS are designated with like reference numerals. The second embodiment of the image stabilizing unit is the same as the first embodiment of the image stabilizing unit except that one end (left end as viewed in FIG. 28) of the X-axis direction stage biasing spring 87x is hooked on the Y-axis direction stage 71, not on the stationary holder 23. More specifically, the X-axis direction stage biasing spring 87x is extended and installed between a spring hook 71w formed on the Y-axis direction stage 71 and the spring hook 21v of the X-axis direction stage 21. The same effect as that of the first embodiment of the image stabilizing unit can be obtained in the second embodiment of the image stabilizing unit.

Although the present invention has been described based on the above illustrated embodiments, the present invention is not limited solely to these particular embodiments. For instance, although each of the above described embodiments of the image stabilizers according to the present invention is an optical image stabilizer incorporated in a digital camera, the present invention can also be applied to an optical image stabilizer incorporated in any other type of optical equipment such as binoculars.

Although the CCD image sensor 60 is supported to be movable linearly in two axial directions (the X-axis direction and the Y-axis direction) in the above illustrated embodiments of the image stabilizing units, a manner (driving directions) of driving the image-stabilizing optical element is not limited solely to this particular driving manner. For instance, the present invention can also be applied to another type of optical image stabilizer which moves the image-stabilizing optical element only in one of the X-axis direction and the Y-axis direction to counteract image shake.

Although the CCD image sensor 60 is driven to counteract image shake in the above illustrated embodiments of the image stabilizing units, the image-stabilizing optical element which is driven to counteract image shake can be any other optical element such as a lens group.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An image stabilizer including at least one guide device which guides an image-stabilizing optical element in at least one guide direction orthogonal to an optical axis and at least one image shake counteracting driving device which moves said image-stabilizing optical element in said guide direction so as to counteract image shake, said image shake counteracting driving device comprising:
    at least one first moving element moved in said guide direction by at least one drive source;
    at least one second moving element which is guided in said guide direction to be movable relative to said first moving element, wherein said second moving element applies a moving force to a holder which holds said image-stabilizing optical element when said second moving element is moved in said guide direction by a movement of said first moving element; and
    a moving-element control mechanism which resiliently connects said first moving element and said second moving element to each other to allow said first moving element and said second moving element to selectively move integrally to each other and relative to each other in accordance with a magnitude of a resistance to a movement occurring between said at least one drive source and said holder.

2. The image stabilizer according to claim 1, wherein said moving-element control mechanism comprises:
    a movement limit portion provided between said first moving element and said second moving element in order to limit the range of relative movement between said first moving element and said second moving element to a predetermined range of movement when said movement limit portion is brought into an engaged state;
    at least one first biasing device which biases said first moving element and said second moving element in directions to bring said movement limit portion into said engaged state; and
    at least one second biasing device which biases said second moving element in a direction opposite to the biasing direction of said first biasing device.

3. The image stabilizer according to claim 2, wherein said first biasing device is greater in biasing force than said second biasing device.

4. The image stabilizer according to claim 2, wherein each of said first biasing device and said second biasing device comprises an extension spring.

5. The image stabilizer according to claim 2, wherein a pair of said movement limit portions are provided between said first moving element and said second moving element.

6. The image stabilizer according to claim 1, further comprising a stationary frame which supports said second moving element in a manner to allow said second moving element to move linearly in said guide direction relative to said stationary frame.

7. The image stabilizer according to claim 6, wherein said first biasing device is installed between said first moving element and said second moving element, and
    wherein said second biasing device is installed between said holder and said stationary frame.

8. The image stabilizer according to claim 1, further comprising an orthogonal moving frame which supports said holder and is movable in a direction orthogonal to said guide direction,
    wherein said first biasing device is installed between said first moving element and said second moving element, and
    wherein said second biasing device is installed between said holder and said orthogonal moving frame.

9. The image stabilizer according to claim 6, wherein said at least one drive source comprises a motor mounted to said stationary frame.

10. The image stabilizer according to claim 1, wherein said at least one drive source comprises a motor having a feed screw with which a driven nut member is screw-engaged to be movable on said feed screw in an axial direction thereof, and
    wherein a movement of said driven nut member which moves on said feed screw in said axial direction thereof by a rotation of said feed screw is transferred to said first moving element with said driven nut member in contact with said first moving element.

11. The image stabilizer according to claim 10, further comprising a biasing device which biases said driven nut member in a direction so as to come in contact with said first moving element.

12. The image stabilizer according to claim 11, wherein said biasing device comprises a compression coil spring positioned around said feed screw between said at least one drive source and said driven nut member.

13. The image stabilizer according to claim 10, wherein said moving-element control mechanism allows said first moving element and said second moving element to move integrally when said driven nut member and said holder are both movable in said guide direction, and allows said first moving element and said second moving element to move relative to each other when one and the other of said driven nut member and said holder are relatively movable and immovable in said guide direction.

14. The image stabilizer according to claim 1, wherein said guide device comprises two guide devices which guide said image-stabilizing optical element linearly in two different guide directions in a plane orthogonal to said optical axis,
    wherein said image shake counteracting driving device comprises two image shake counteracting driving devices which move said image-stabilizing optical element in said two different guide directions, respectively, so as to counteract image shake, and
    wherein each of said two image shake counteracting driving devices includes said first moving element, said second moving element and said moving-element control mechanism.

15. The image stabilizer according to claim 14, wherein said two different guide directions are orthogonal to each other.

16. The image stabilizer according to claim 1, wherein said image stabilizer is incorporated in an imaging device, said image-stabilizing optical element comprising an image pickup device.

17. The image stabilizer according to claim 1, wherein said image stabilizer is incorporated in a digital camera having a zoom lens.

18. An image stabilizer including an image-stabilizing optical element guided in at least one guide direction in a plane orthogonal to an optical axis and at least one image shake counteracting driving device which moves said image-stabilizing optical element in said guide direction so as to counteract image shake, said image shake counteracting driving device comprising:

a first moving element which is guided in said guide direction, and moved in said guide direction by a drive source of said image shake counteracting driving device;

a second moving element which is guided in said guide direction to be movable in said guide direction relative to said first moving element, wherein said second moving element transfers a motion of said first moving element to a holder of said image-stabilizing optical element; and a control mechanism which resiliently connects said first moving element and said second moving element to each other to allow said first moving element and said second moving element to selectively move integrally and relative to each other in accordance with a magnitude of a resistance to a movement of one of said first moving element and said second moving element relative to each other.

* * * * *